(12) United States Patent
Li et al.

(10) Patent No.: US 12,336,948 B1
(45) Date of Patent: Jun. 24, 2025

(54) SANDWICH BIONIC SOFT GRIPPER CAPABLE OF AUTOMATICALLY ASSISTING IN GRASPING AND PREPARATION METHOD THEREFOR

(71) Applicant: North University of China, Taiyuan (CN)

(72) Inventors: Xiangmeng Li, Taiyuan (CN); Huifen Wei, Taiyuan (CN); Xijing Zhu, Taiyuan (CN); Yajun Zhang, Taiyuan (CN); Jian Shen, Taiyuan (CN); Chaohui Wang, Taiyuan (CN)

(73) Assignee: North University of China (CN)

( * ) Notice: Subject to any disclaimer, the term of this patent is extended or adjusted under 35 U.S.C. 154(b) by 0 days.

(21) Appl. No.: 19/016,418

(22) Filed: Jan. 10, 2025

(30) Foreign Application Priority Data

Apr. 11, 2024 (CN) .......................... 202410430792.X

(51) Int. Cl.
*A61H 1/02* (2006.01)
*B25J 1/02* (2006.01)

(52) U.S. Cl.
CPC .............. *A61H 1/0288* (2013.01); *B25J 1/02* (2013.01); *A61H 2201/0207* (2013.01);
(Continued)

(58) Field of Classification Search
CPC .......... A61H 1/0288; A61H 2201/0207; A61H 2201/0214; A61H 2201/0221;
(Continued)

(56) References Cited

U.S. PATENT DOCUMENTS 5,765,228 A * 6/1998 Bieling ................ A61H 1/0288
2/163
6,239,410 B1 * 5/2001 Tackore ........... A41D 19/01535
219/211
(Continued)

FOREIGN PATENT DOCUMENTS

CN 113084852 A 7/2021
CN 113246168 A 8/2021
(Continued)

OTHER PUBLICATIONS

Machine translation of written description and claims of CN114102657A via espacenet (Year: 2021).*
(Continued)

*Primary Examiner* — Timothy A Stanis
*Assistant Examiner* — Tyler A Raubenstraw
(74) *Attorney, Agent, or Firm* — Lerner David LLP

(57) ABSTRACT

A sandwich bionic soft gripper capable of automatically assisting in grasping and a preparation method therefor are provided, relating to the technical field of manipulators. The sandwich bionic soft gripper capable of automatically assisting in grasping includes a glove and fourteen power structures. Each power structure includes two drivers, a variable-stiffness grid layer, a pair of transmission skeletons, and a strain sensor. Each driver includes a flexible heat insulation layer, a flexible electric heating layer, a pair of flexible wires A, a flexible packaging layer A, a pair of liquid crystal elastomer driving layers, a thin film temperature sensor, a flexible water cooling layer, and a flexible water pipe. Each strain sensor includes a flexible sensitive layer, a flexible interdigital electrode, a flexible packaging layer B, and a pair of flexible wires B.

6 Claims, 16 Drawing Sheets

(52) U.S. Cl.
CPC ............... *A61H 2201/0214* (2013.01); *A61H 2201/0221* (2013.01); *A61H 2201/0242* (2013.01); *A61H 2201/1207* (2013.01); *A61H 2201/1635* (2013.01); *A61H 2201/165* (2013.01); *A61H 2201/5082* (2013.01)

(58) Field of Classification Search
CPC .... A61H 2201/0242; A61H 2201/1207; A61H 2201/1635; A61H 2201/165; A61H 2201/5082; A61H 1/0285; A61H 1/0237; A61H 1/0274; A61H 1/02; B25J 1/02; B25J 9/0006; A41D 19/01535; A41D 19/01541; A41D 19/01547; A41D 19/01558; A41D 19/01564; A41D 13/087; A63B 21/4001; A61F 5/0102
See application file for complete search history.

(56) References Cited

U.S. PATENT DOCUMENTS

| | | | | |
|---|---|---|---|---|
| 10,449,677 | B1* | 10/2019 | Al Najjar | B25J 9/0006 |
| 10,682,250 | B1* | 6/2020 | Al Najjar | B25J 9/0006 |
| 10,888,487 | B1* | 1/2021 | Rogers | A41D 19/015 |
| 2005/0143679 | A1* | 6/2005 | Gelber | A61H 7/005 |
| | | | | 601/72 |
| 2009/0048649 | A1* | 2/2009 | Peret | A61H 9/0057 |
| | | | | 607/104 |
| 2016/0075036 | A1 | 3/2016 | Lessing et al. | |
| 2019/0038222 | A1* | 2/2019 | Krimon | A61B 5/6806 |
| 2019/0209182 | A1* | 7/2019 | Singh | A61B 17/135 |
| 2019/0298605 | A1* | 10/2019 | Rabolt | A61H 23/0263 |
| 2019/0336381 | A1* | 11/2019 | Koltzi | A61H 1/0285 |
| 2019/0374422 | A1* | 12/2019 | Yeow | B25J 9/0006 |
| 2020/0324402 | A1* | 10/2020 | Roh | A61H 1/00 |
| 2020/0330315 | A1* | 10/2020 | Khalaf | A61H 7/004 |
| 2021/0205103 | A1 | 7/2021 | Xiao et al. | |
| 2021/0215554 | A1* | 7/2021 | Araromi | A61B 5/6843 |
| 2021/0220206 | A1* | 7/2021 | Wijesundara | F15B 15/08 |
| 2021/0338413 | A1* | 11/2021 | Haluska | A61H 23/0254 |
| 2022/0023133 | A1* | 1/2022 | Woge | A61B 5/225 |
| 2022/0126442 | A1* | 4/2022 | Wen | B25J 15/0009 |
| 2023/0003558 | A1* | 1/2023 | Shepherd | G02B 6/10 |
| 2023/0091400 | A1* | 3/2023 | Acome | H02N 1/006 |
| | | | | 294/119.3 |
| 2023/0106364 | A1 | 4/2023 | Alvarado et al. | |
| 2023/0139608 | A1* | 5/2023 | Song | A61H 1/0285 |
| | | | | 601/5 |
| 2023/0338220 | A1* | 10/2023 | Johnson | A61H 1/0285 |
| 2024/0009068 | A1* | 1/2024 | Papadopoulou | A61F 5/34 |
| 2024/0225881 | A1* | 7/2024 | Katz | A61H 1/0288 |

FOREIGN PATENT DOCUMENTS

| | | |
|---|---|---|
| CN | 114102657 A | 3/2022 |
| CN | 116277120 A | 6/2023 |
| CN | 116898452 A | 10/2023 |
| CN | 117130474 A | 11/2023 |
| CN | 117245681 A | 12/2023 |
| WO | WO-2024059105 A2 * | 3/2024 |

OTHER PUBLICATIONS

Sujun, Yu, "Design and Analysis of Bionic Flexible Manipulator Based on Macroporous Multilayer IPMC Actuator", Full text of excellent masters thesis in China Database (Information Technology Series), Mar. 2022, 94 pages, 2023 Annual vol. No. 02.

Shen, J. et al., "Research on Dynamic Simulation and Cooperative Control of Smart Ammunition Formation", 2020 IEEE International Conference on Mechatronics and Automation (ICMA), Oct. 2020, pp. 1488-1492.

Xiaodong, Z. et al., "Study on the adjustable bending performance of pneumatic soft gripper finger", Machine Design and Manufacturing Engineering, Mar. 2023, pp. 39-42, vol. 52, No. 3. [Providing English Translation of Abstract only].

Search Report dated May 14, 2024 for Chinese Application No. 202410430792.X, 5pages.

* cited by examiner

SANDWICH BIONIC SOFT GRIPPER CAPABLE OF AUTOMATICALLY ASSISTING IN GRASPING AND PREPARATION METHOD THEREFOR

CROSS-REFERENCE TO RELATED APPLICATION

This patent application claims the benefit and priority of Chinese Patent Application No. 202410430792.X filed with the China National Intellectual Property Administration on Apr. 11, 2024, the disclosure of which is incorporated by reference herein in its entirety as part of the present disclosure.

TECHNICAL FIELD

The present disclosure relates to the technical field of manipulators, and in particular, to a sandwich bionic soft gripper capable of automatically assisting in grasping and a preparation method therefor.

BACKGROUND

In daily life, many people may lose their hand strength due to illness, injury, or other reasons. The loss of the hand strength directly leads to the inability of a patient to perform hand activities such as strong grasping and stable release, which not only causes great inconvenience to daily life of the patient, and severely affects physical and mental health of the patient. In recent years, flexible functional materials have been widely used in the field of medical care due to their excellent biocompatibility and human-machine interaction. Under this background, it is necessary to invent a sandwich bionic soft gripper capable of automatically assisting in grasping and a preparation method therefor based on a flexible functional material, to solve the problem of inability of the patient to perform hand activities due to the loss of hand strength.

SUMMARY

In order to solve the problem of inability of a patient to perform hand activities due to the loss of hand strength, the present disclosure provides a sandwich bionic soft gripper capable of automatically assisting in grasping and a preparation method therefor.

The present disclosure is implemented by using the following technical solutions.

A sandwich bionic soft gripper capable of automatically assisting in grasping includes a glove and fourteen power structures;

each power structure includes two drivers, a variable-stiffness grid layer, a pair of transmission skeletons, and a strain sensor;
each driver includes a flexible heat insulation layer, a flexible electric heating layer, a pair of flexible wires A, a flexible packaging layer A, a pair of liquid crystal elastomer driving layers, a thin film temperature sensor, a flexible water cooling layer, and a flexible water pipe; a front surface of the flexible heat insulation layer is provided with a cavity; the flexible electric heating layer is stacked on a bottom surface of the cavity; the pair of flexible wires A is embedded inside the flexible heat insulation layer; each head end of the pair of flexible wires A is connected to the flexible electric heating layer; each tail end of the pair of flexible wires A is led out; the flexible packaging layer A is stacked on both the front surface of the flexible heat insulation layer and a front surface of the flexible electric heating layer; the pair of liquid crystal elastomer driving layers is stacked side by side on a front surface of the flexible packaging layer A; the thin film temperature sensor is stacked on the front surface of the flexible packaging layer A, and the thin film temperature sensor is located between the pair of liquid crystal elastomer driving layers; two ends of the thin film temperature sensor are led out; the flexible water cooling layer is stacked on the front surface of the flexible packaging layer A, a front surface of the pair of liquid crystal elastomer driving layers, and a front surface of the thin film temperature sensor; a front surface edge of the flexible water cooling layer is provided with a pair of mutually symmetrical notches; the flexible water pipe is embedded inside the flexible water cooling layer; two ends of the flexible water pipe are led out;
front surfaces of two flexible water cooling layers in each power structure are in butt joint with each other, and the variable-stiffness grid layer in each power structure is sandwiched between the front surfaces of the two flexible water cooling layers; two pairs of notches in each power structure are in butt joint to form a pair of concave holes, and one pair of transmission skeletons in each power structure is inserted into one pair of concave holes, respectively;
each strain sensor includes a flexible sensitive layer, a flexible interdigital electrode, a flexible packaging layer B, and a pair of flexible wires B; the flexible sensitive layer is stacked on a back surface of a first flexible heat insulation layer corresponding to the power structure; the flexible interdigital electrode is stacked on a front surface of the flexible sensitive layer; the flexible packaging layer B is stacked on the back surface of the first flexible heat insulation layer corresponding to the power structure, the front surface of the flexible sensitive layer and a front surface of the flexible interdigital electrode; the pair of flexible wires B is embedded inside the flexible packaging layer B; head ends of the pair of flexible wires B are respectively connected to two poles of the flexible interdigital electrode; each tail end of the pair of flexible wires B is led out;
the glove is of a double-layer structure; the fourteen power structures are all sandwiched between a finger dorsum inner layer and a finger dorsum outer layer of the glove, and the fourteen power structures are located in a one-to-one correspondence at nine interphalangeal joints and five metacarpophalangeal joints of the glove; tail ends of each pair of flexible wires A, two ends of each thin film temperature sensor, two ends of each flexible water pipe, and tail ends of each pair of flexible wires B penetrate the finger dorsum outer layer of the glove to be led out; each transmission skeleton is arranged along a direction of a corresponding finger; and each flexible packaging layer B is in contact with the finger dorsum outer layer of the glove.

An inner layer of the glove is made of polyester fiber; and an outer layer of the glove is made of polyester.

The flexible heat insulation layer has a thickness of 2 mm; the cavity has a depth of 1 mm; the liquid crystal elastomer driving layer has a thickness of 0.5 mm; and the flexible water cooling layer has a thickness of 1.5 mm.

A preparation method for a sandwich bionic soft gripper capable of automatically assisting in grasping (the method is used to prepare the sandwich bionic soft gripper capable of automatically assisting in grasping according to the present disclosure) is provided. The method is implemented by the following steps:

step 1: preparing a first driver, with specific steps as follows:

step 1.1: injecting ESSIL296 silicone rubber into a mold, immersing a first pair of flexible wires A in the ESSIL296 silicone rubber, and then curing and molding to obtain the first flexible heat insulation layer with a front surface provided with a first cavity;

step 1.2: evenly spraying a carbon nanotube suspension on a bottom surface of the first cavity, and then heating the carbon nanotube suspension to volatilize a solvent thereof to obtain a first flexible electric heating layer;

step 1.3: performing low surface energy treatment on the first flexible heat insulation layer and the first flexible electric heating layer by using a KH550 hydrolyzed silane coupling agent solution;

step 1.4: pouring a pre-prepared Ecoflex00-50 prepolymer mixture on a front surface of the first flexible heat insulation layer and a front surface of the first flexible electric heating layer, and then curing and molding to obtain a first flexible packaging layer A;

step 1.5: injecting a pre-prepared liquid crystal elastomer mixture into the mold, and then curing and molding to obtain a first pair of liquid crystal elastomer driving layers;

step 1.6: performing the low surface energy treatment on the first flexible packaging layer A and the first pair of liquid crystal elastomer driving layers by using the KH550 hydrolyzed silane coupling agent solution, and then bonding the first pair of liquid crystal elastomer driving layers to a front surface of the first flexible packaging layer A side by side;

step 1.7: bonding a pre-selected first thin film temperature sensor to the front surface of the first flexible packaging layer A, and ensuring that the first thin film temperature sensor is located between the first pair of liquid crystal elastomer driving layers; and step 1.8: pouring the pre-prepared Ecoflex00-50 prepolymer mixture on the front surface of the first flexible packaging layer A, each front surface of the first pair of liquid crystal elastomer driving layers and a front surface of the first thin film temperature sensor, immersing a first flexible water pipe in the Ecoflex00-50 prepolymer mixture, and then curing and molding at 85° C. to obtain a first flexible water cooling layer; and then, providing a first pair of notches in a front surface edge of the first flexible water cooling layer to obtain the first driver;

step 2: preparing a second driver, with specific steps as follows:

step 2.1: injecting the ESSIL296 silicone rubber into the mold, immersing a second pair of flexible wires A in the ESSIL296 silicone rubber, and then curing and molding to obtain a second flexible heat insulation layer with a front surface provided with a second cavity;

step 2.2: evenly spraying the carbon nanotube suspension on a bottom surface of the second cavity, and then heating the carbon nanotube suspension to volatilize the solvent thereof to obtain a second flexible electric heating layer;

step 2.3: performing the low surface energy treatment on the second flexible heat insulation layer and the second flexible electric heating layer by using the KH550 hydrolyzed silane coupling agent solution;

step 2.4: pouring the pre-prepared Ecoflex00-50 prepolymer mixture on a front surface of the second flexible heat insulation layer and a front surface of the second flexible electric heating layer, and then curing and molding to obtain a second flexible packaging layer A;

step 2.5: injecting the pre-prepared liquid crystal elastomer mixture into the mold, and then curing and molding to obtain a second pair of liquid crystal elastomer driving layers;

step 2.6: performing the low surface energy treatment on the second flexible packaging layer A and the second pair of liquid crystal elastomer driving layers by using the KH550 hydrolyzed silane coupling agent solution, and then bonding the second pair of liquid crystal elastomer driving layers to a front surface of the second flexible packaging layer A side by side;

step 2.7: bonding a pre-selected second thin film temperature sensor to the front surface of the second flexible packaging layer A, and ensuring that the second thin film temperature sensor is located between the second pair of liquid crystal elastomer driving layers; and step 2.8: pouring the pre-prepared Ecoflex00-50 prepolymer mixture on the front surface of the second flexible packaging layer A, each front surface of the second pair of liquid crystal elastomer driving layers and a front surface of the second thin film temperature sensor, immersing a second flexible water pipe in the Ecoflex00-50 prepolymer mixture, and then curing and molding at 24° C. to obtain a second flexible water cooling layer; and then, providing a second pair of notches in a front surface edge of the second flexible water cooling layer to obtain the second driver;

step 3: preparing a variable-stiffness grid layer, with specific steps as follows:

heating and melting a low melting alloy (metals and their alloys with melting points below 300° C., e.g., tin bismuth alloy with melting point below 60° C.) and then injecting the alloy into the mold, and then performing hot pressing molding to obtain the variable-stiffness grid layer;

step 4: preparing a pair of transmission skeletons, with specific steps as follows:

heating and melting a thermoplastic polyurethane elastomer and then injecting the thermoplastic polyurethane elastomer into the mold, and then performing hot pressing molding to obtain the pair of transmission skeletons;

step 5: placing the variable-stiffness grid layer between the front surfaces of the two flexible water cooling layers, bonding the front surfaces of the two flexible water cooling layers to each other to cause the two pairs of notches to be in butt joint to form the pair of concave holes, and then inserting the pair of transmission skeletons into the pair of concave holes;

step 6: preparing the strain sensor, with specific steps as follows:

step 6.1: preparing the flexible sensitive layer, with specific steps as follows:

mixing polydimethylsiloxane, silver nanosheets, and reduced graphene oxide at a mass ratio of 10:10:1 and then evenly stirring to obtain a mixed slurry, and then preparing the flexible sensitive layer made of the mixed slurry on the back surface of the first flexible heat insulation layer by a blade coating method;

step 6.2: preparing a flexible interdigital electrode, with specific steps as follows:

preparing a substrate made of the ESSIL296 silicone rubber by the blade coating method, printing the flexible interdigital electrode on the substrate by a piezoelectric inkjet printer, and then transferring the flexible interdigital electrode to a front surface of the flexible sensitive layer;

step 6.3: preparing a flexible packaging layer B, with specific steps as follows:

pouring a pre-prepared Ecoflex00-50 prepolymer mixture on the back surface of the first flexible heat insulation layer, the front surface of the flexible sensitive layer, and a front surface of the flexible interdigital electrode, immersing a pair of flexible wires B in the Ecoflex00-50 prepolymer mixture, and then curing and molding to obtain the flexible packaging layer B, to prepare the strain sensor and thus prepare the power structure;

step 7: repeating the steps 1 to 6 to prepare the fourteen power structures; and step 8: sewing the fourteen power structures between the finger dorsum inner layer and the finger dorsum outer layer of the glove, which, in an aspect, ensures that the fourteen power structures are located in a one-to-one correspondence at nine interphalangeal joints and five metacarpophalangeal joints of the glove, in another aspect, ensures that tail ends of each pair of flexible wires A, two ends of each thin film temperature sensor, two ends of each flexible water pipe, and tail ends of each pair of flexible wires B penetrate the finger dorsum outer layer of the glove to be led out, in a third aspect, ensures that each transmission skeleton is arranged along a direction of a corresponding finger, and in a fourth aspect, ensures that each flexible packaging layer B is in contact with the finger dorsum outer layer of the glove.

The preparation of the Ecoflex00-50 prepolymer mixture includes following steps: mixing an Ecoflex00-50 component A and an Ecoflex00-50 component B at a mass ratio of 1:1 and evenly stirring to obtain the Ecoflex00-50 prepolymer mixture, where the Ecoflex00-50 component A is a platinum catalyzed silicone rubber matrix; and the Ecoflex00-50 component B is a curing agent of platinum catalyzed silicone rubber matrix.

The preparation of the liquid crystal elastomer mixture includes following steps: first mixing liquid crystal monomers and toluene in a beaker at a mass ratio of 115:36 to obtain a liquid crystal monomer mixed liquor; and then placing the liquid crystal monomer mixed liquor on a drying table at 100° C. for heating for 20 min, sequentially adding pentaerythritol tetra(3-mercaptopropionate), 2-hydroxy-2-methylpropiophenone and dopamine into the liquid crystal monomer mixed liquor, magnetically stirring for 3 min, and performing vacuum degassing for 2 min to obtain the liquid crystal elastomer mixture, where the pentaerythritol tetra(3-mercaptopropionate) is used as a crosslinking agent, and the pentaerythritol tetra(3-mercaptopropionate) and the liquid crystal monomer mixed liquor are at a mass ratio of 1:151; the 2-hydroxy-2-methylpropiophenone is used as a photoinitiator, and the 2-hydroxy-2-methylpropiophenone and the liquid crystal monomer mixed liquor are at a mass ratio of 25:151; and the dopamine is used as a catalyst.

The sandwich bionic soft gripper capable of automatically assisting in grasping according to the present disclosure is driven in a unique manner that a liquid crystal elastomer is heated and deformed. By means of the flexible heat insulation layer with a high heat insulation capability, the variable-stiffness grid layer with good adaptability, and the strain sensor and thin film temperature sensor with a small volume and high sensitivity, a patient whose hand strength is lost is automatically assisted in performing hand activities such as strong grasping and stable release, thereby greatly facilitating daily life of the patient, and effectively improving physical and mental health of the patient.

The present disclosure effectively solves the problem of inability of the patient to perform hand activities due to the loss of hand strength, and is applicable to the field of medical care.

Figure 1:
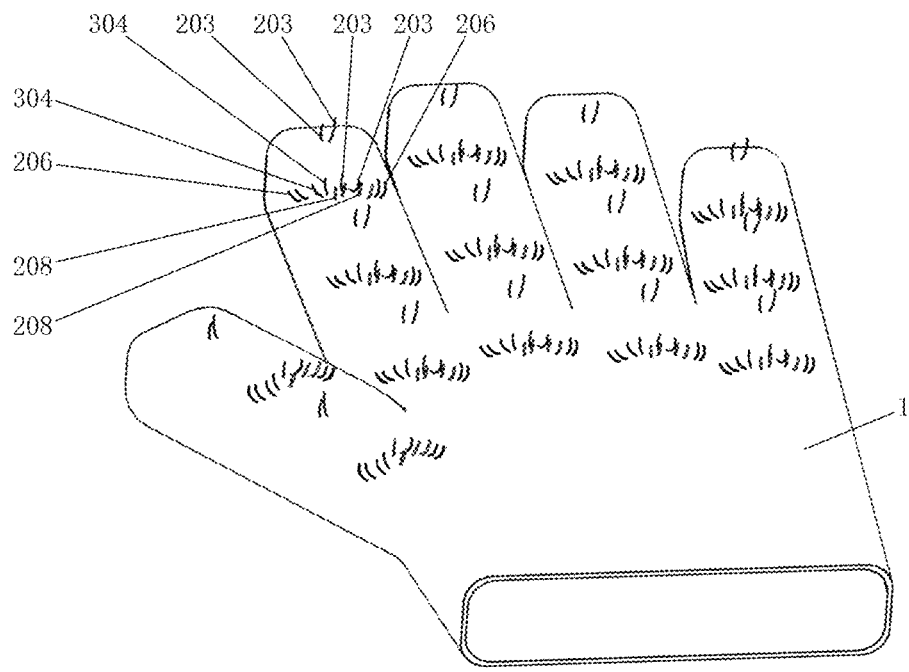
FIG. 1 is a schematic diagram of a structure according to the present disclosure.
Figure 2:
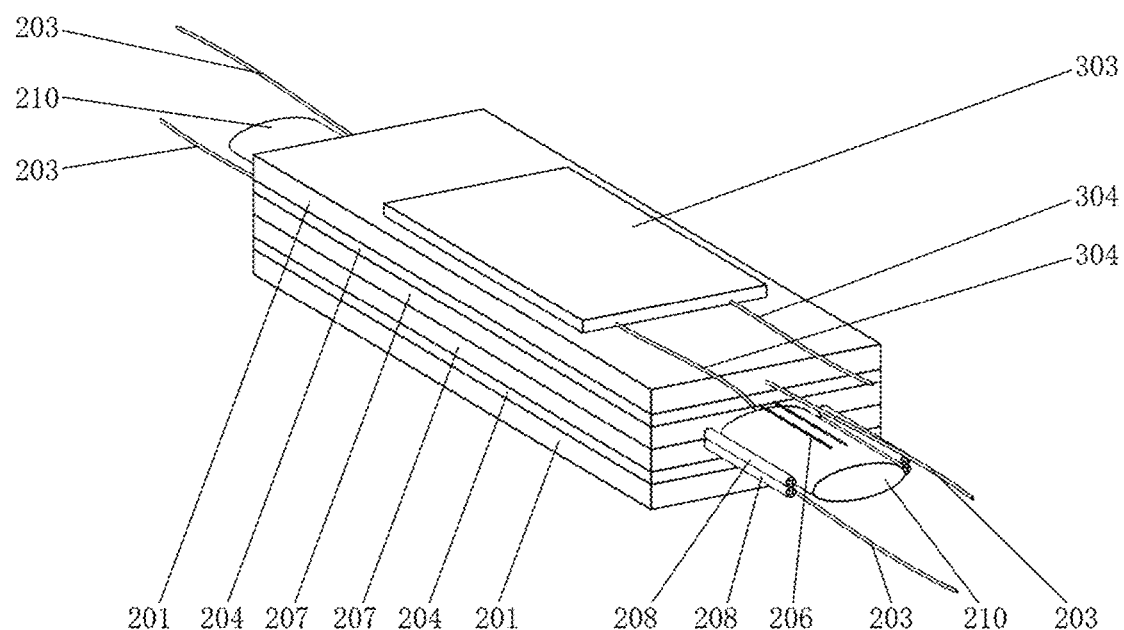
FIG. 2 is a schematic structural diagram of a single power structure in the present disclosure.
Figure 3:
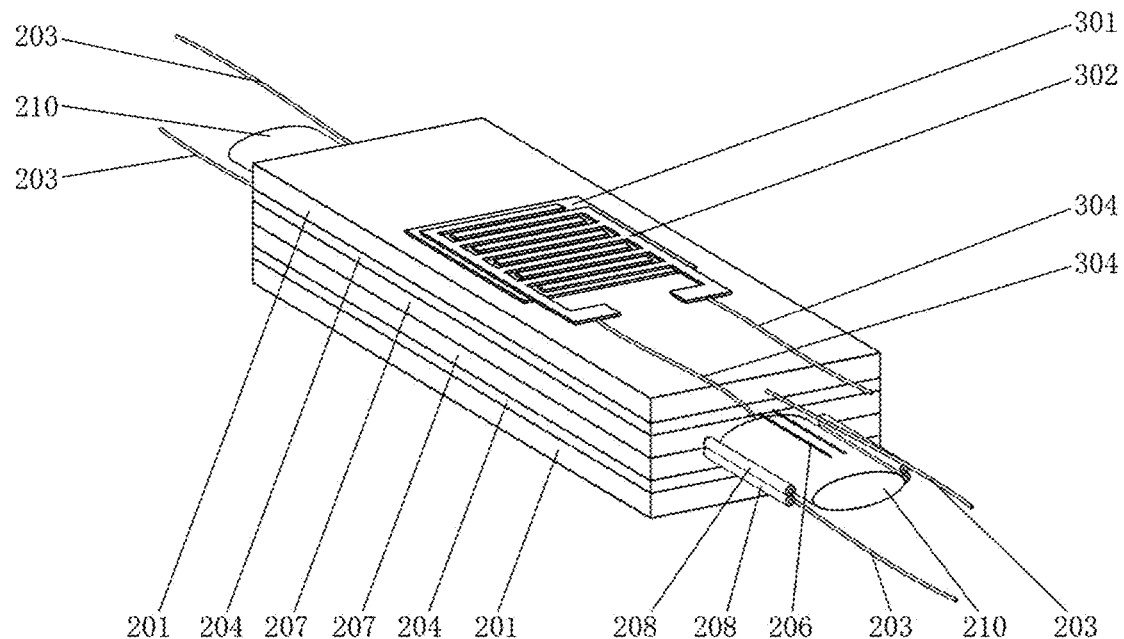
FIG. 3 is a schematic diagram of a partial structure of FIG. 2.
Figure 4:
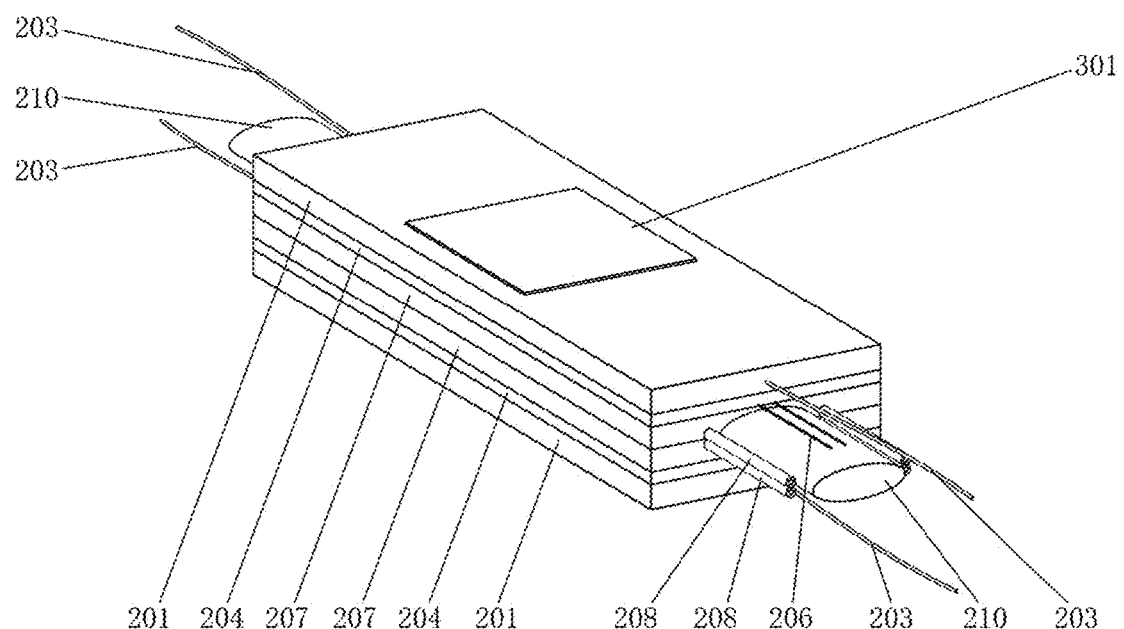
FIG. 4 is a schematic diagram of a partial structure of FIG. 3.
Figure 5:
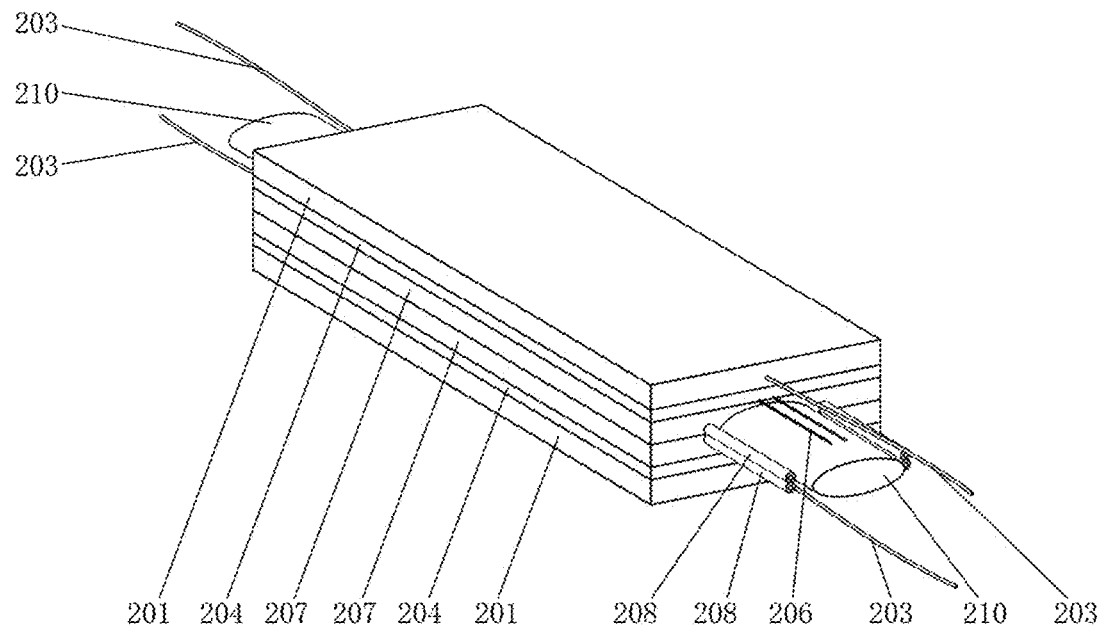
FIG. 5 is a schematic diagram of a partial structure of FIG. 4.
Figure 6:
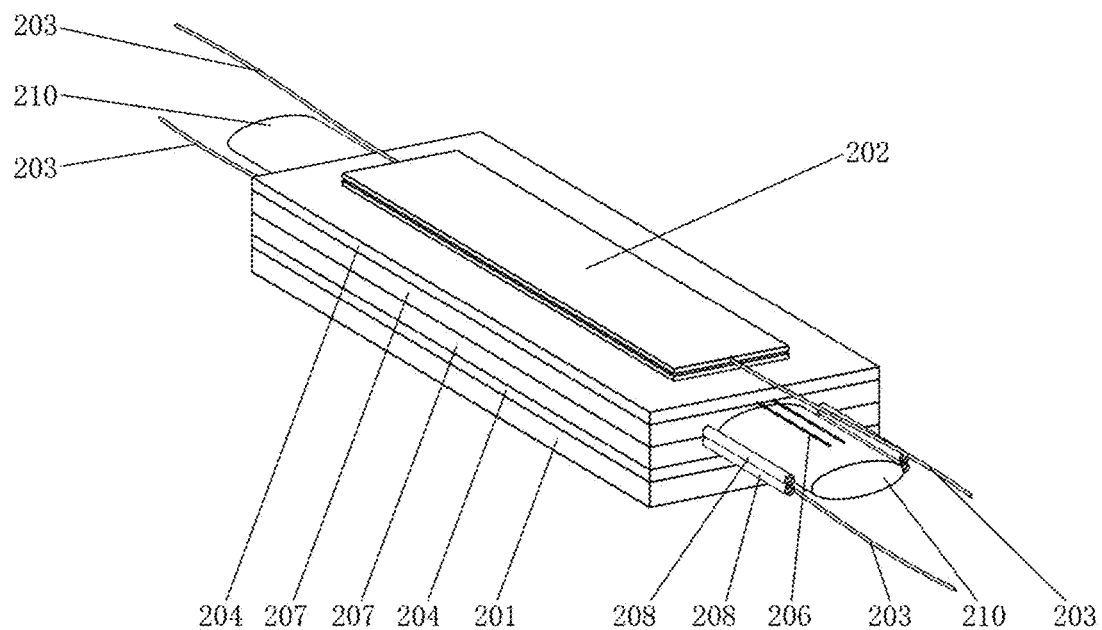
FIG. 6 is a schematic diagram of a partial structure of FIG. 5.
Figure 7:
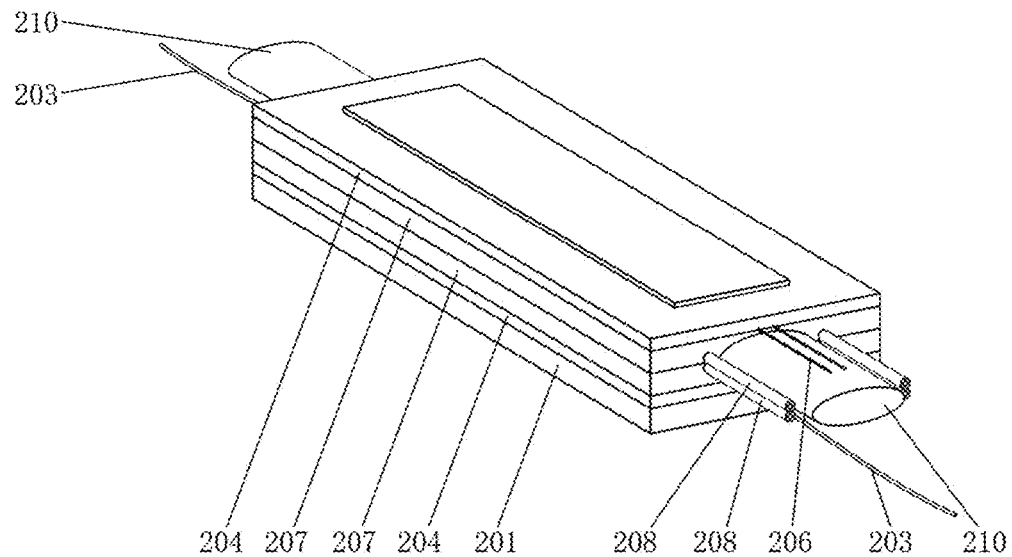
FIG. 7 is a schematic diagram of a partial structure of FIG. 6.
Figure 8:
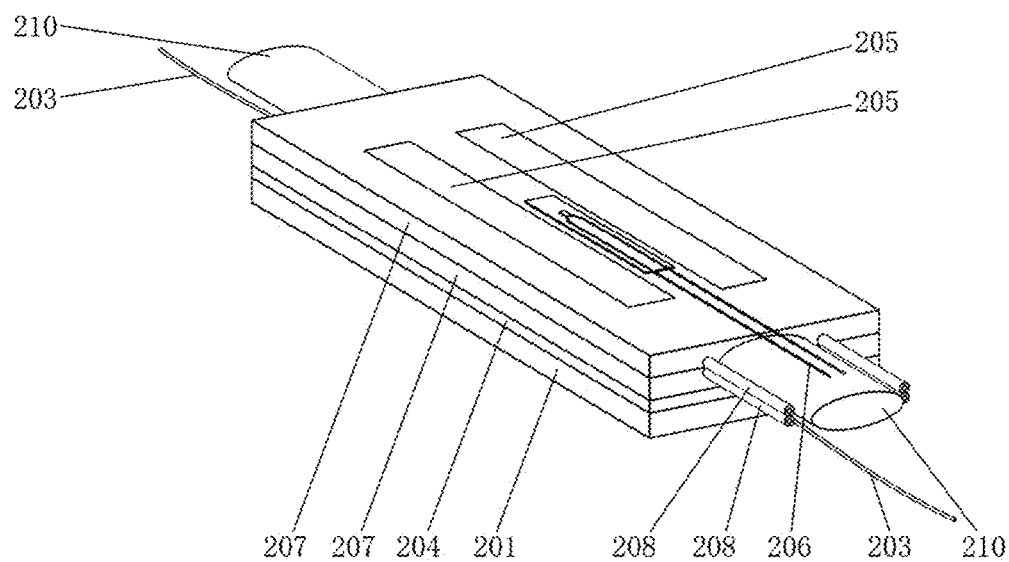
FIG. 8 is a schematic diagram of a partial structure of FIG. 7.
Figure 9:
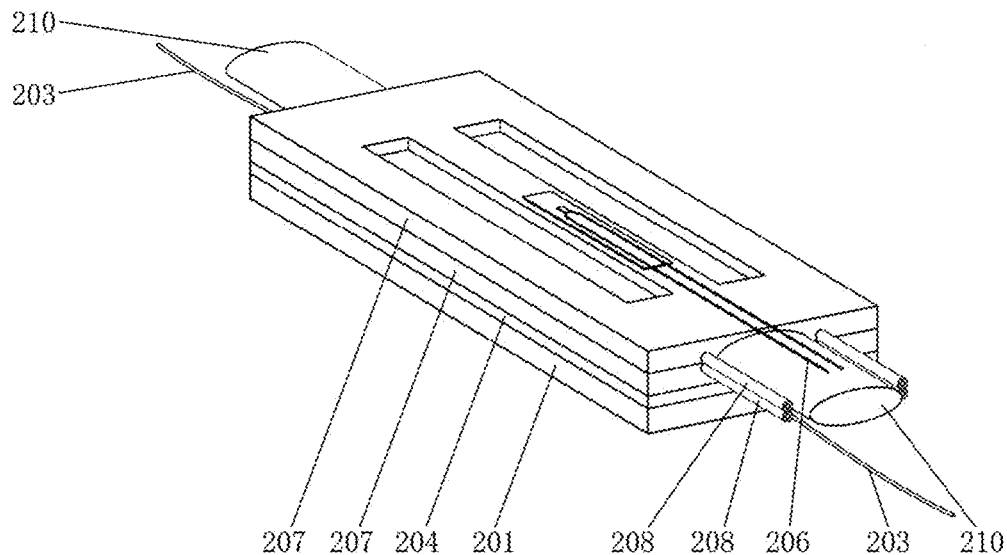
FIG. 9 is a schematic diagram of a partial structure of FIG. 8.
Figure 10:
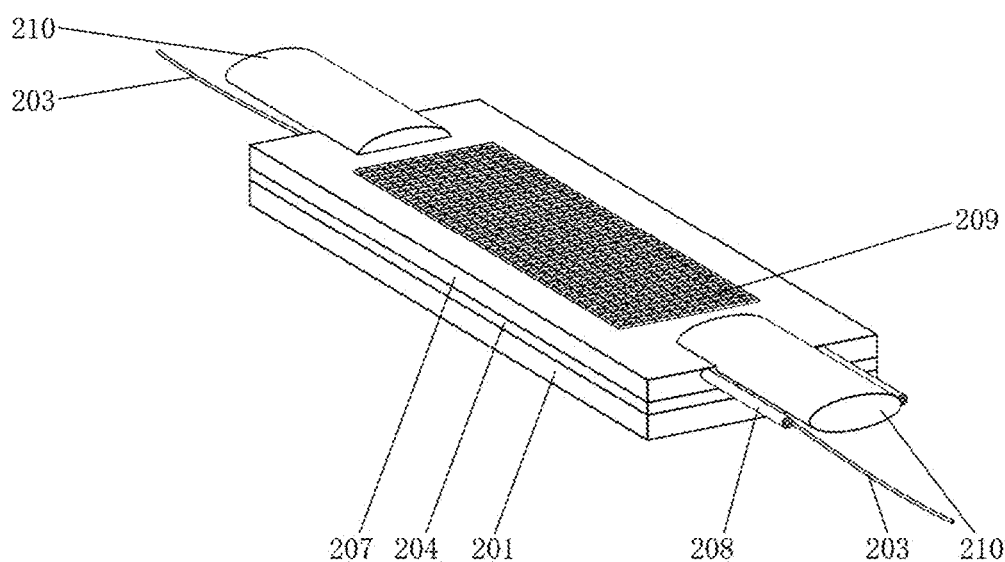
FIG. 10 is a schematic diagram of a partial structure of FIG. 9.
Figure 11:
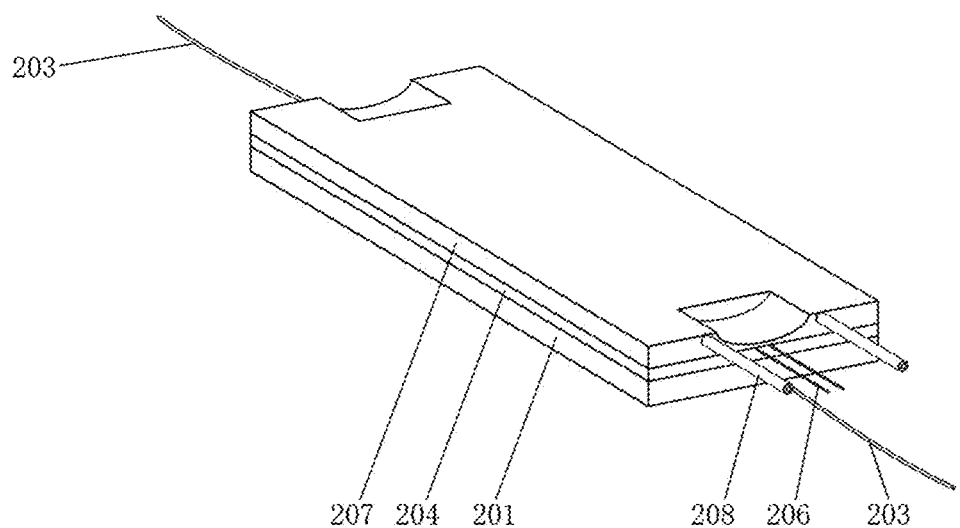
FIG. 11 is a schematic diagram of a partial structure of FIG. 10.
Figure 12:
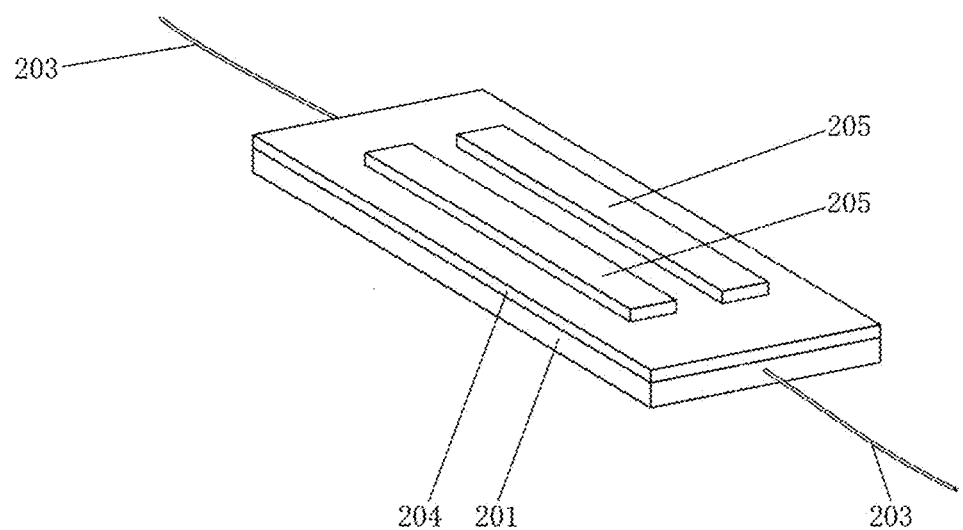
FIG. 12 is a schematic diagram of a partial structure of FIG. 11.
Figure 13:
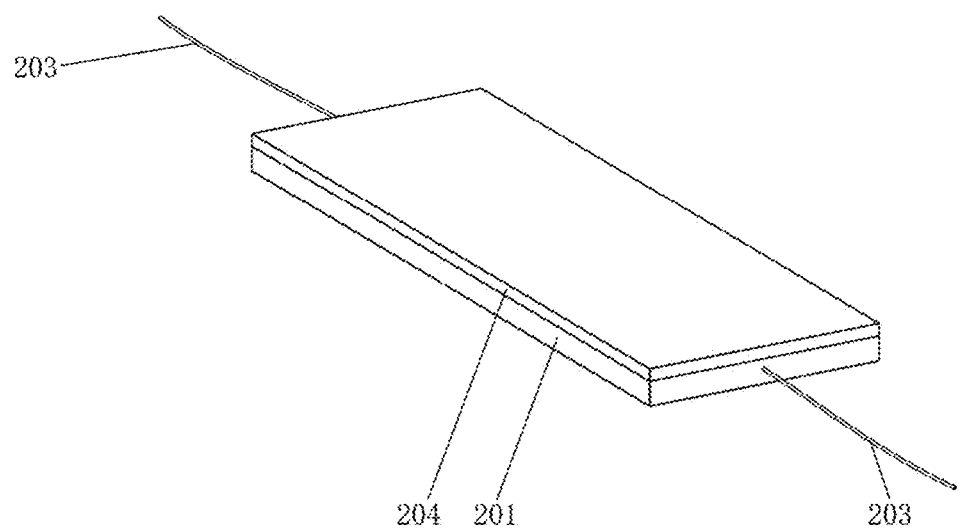
FIG. 13 is a schematic diagram of a partial structure of FIG. 12.
Figure 14:
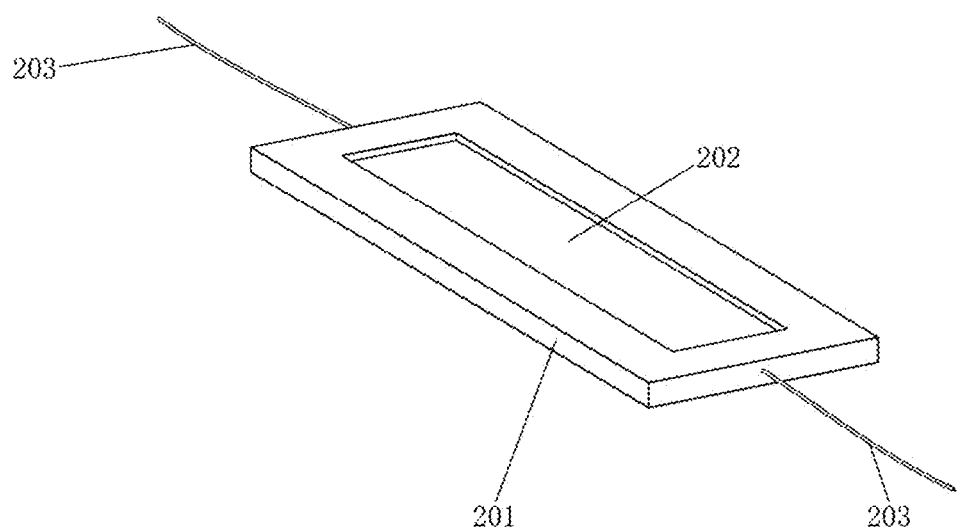
FIG. 14 is a schematic diagram of a partial structure of FIG. 13.
Figure 15:
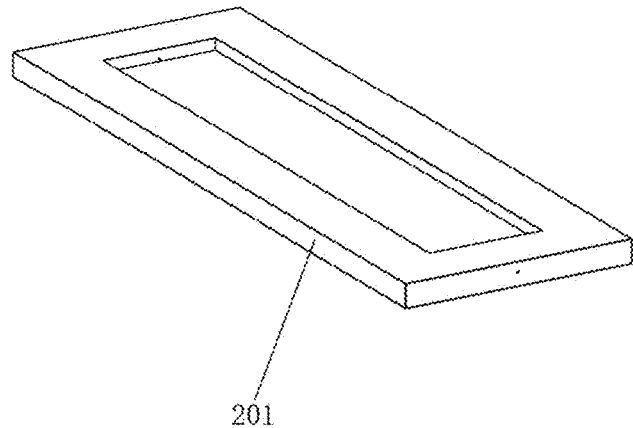
FIG. 15 is a schematic diagram of a partial structure of FIG. 14.
Figure 16:
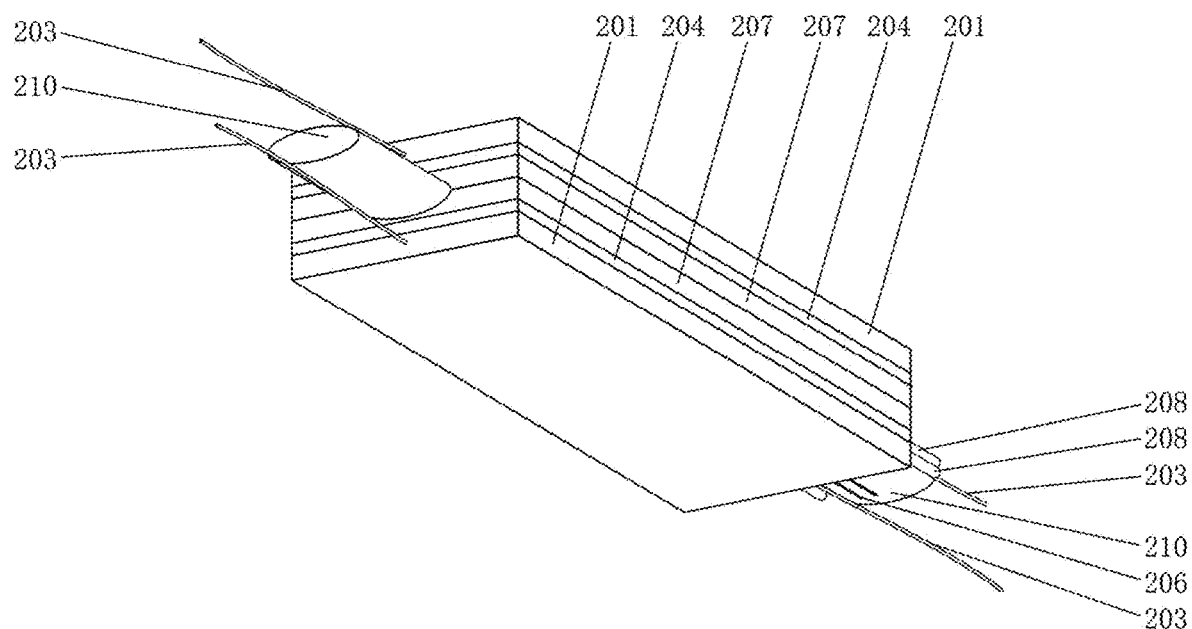
FIG. 16 is a schematic diagram of a structure of FIG. 2 from another angle.
Figure 17:
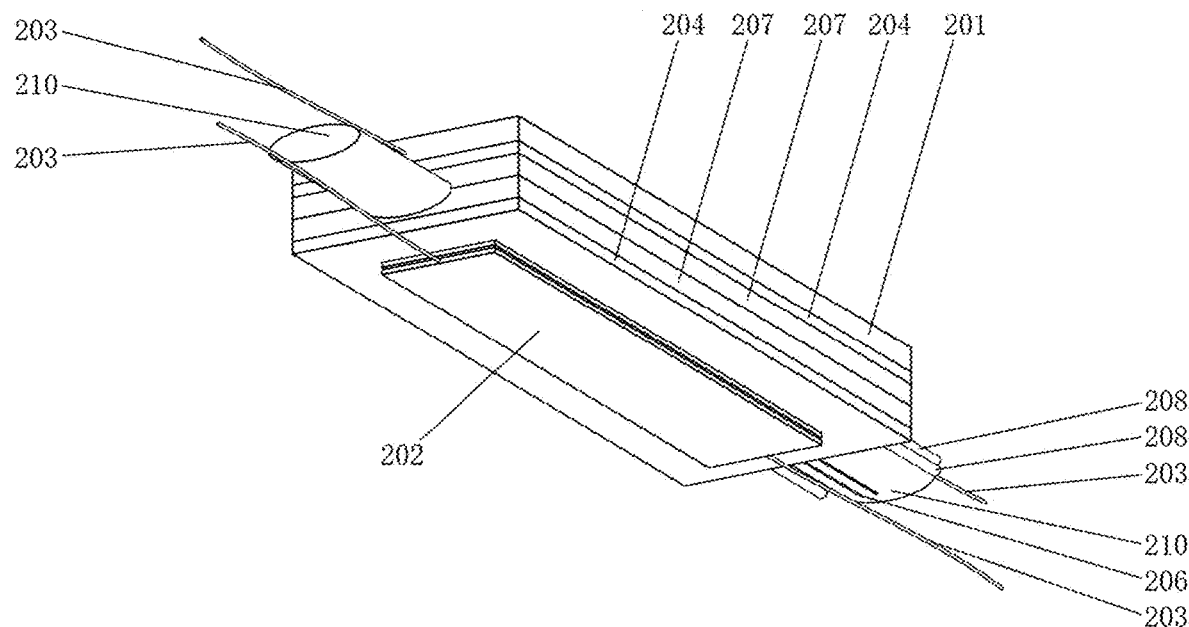
FIG. 17 is a schematic diagram of a partial structure of FIG. 16.
Figure 18:
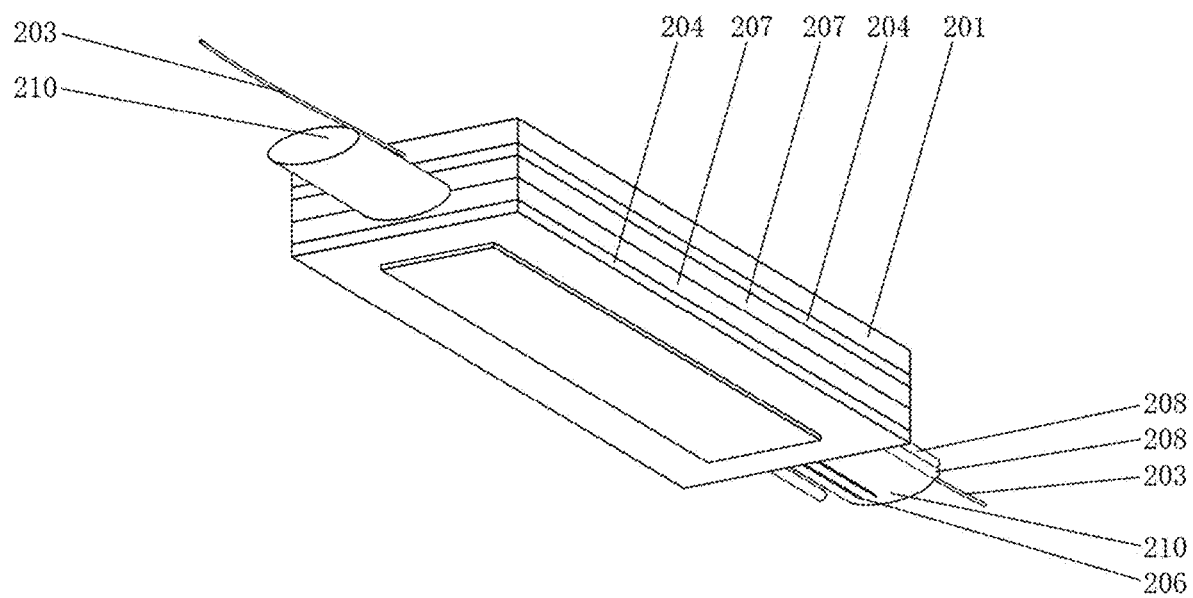
FIG. 18 is a schematic diagram of a partial structure of FIG. 17.
Figure 19:
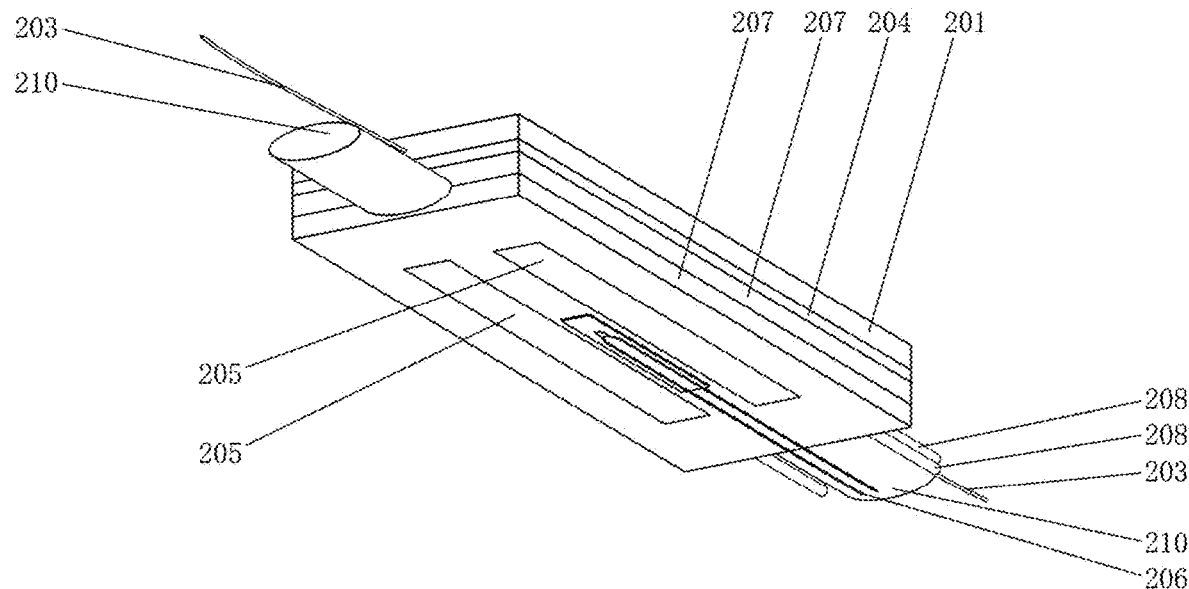
FIG. 19 is a schematic diagram of a partial structure of FIG. 18.
Figure 20:
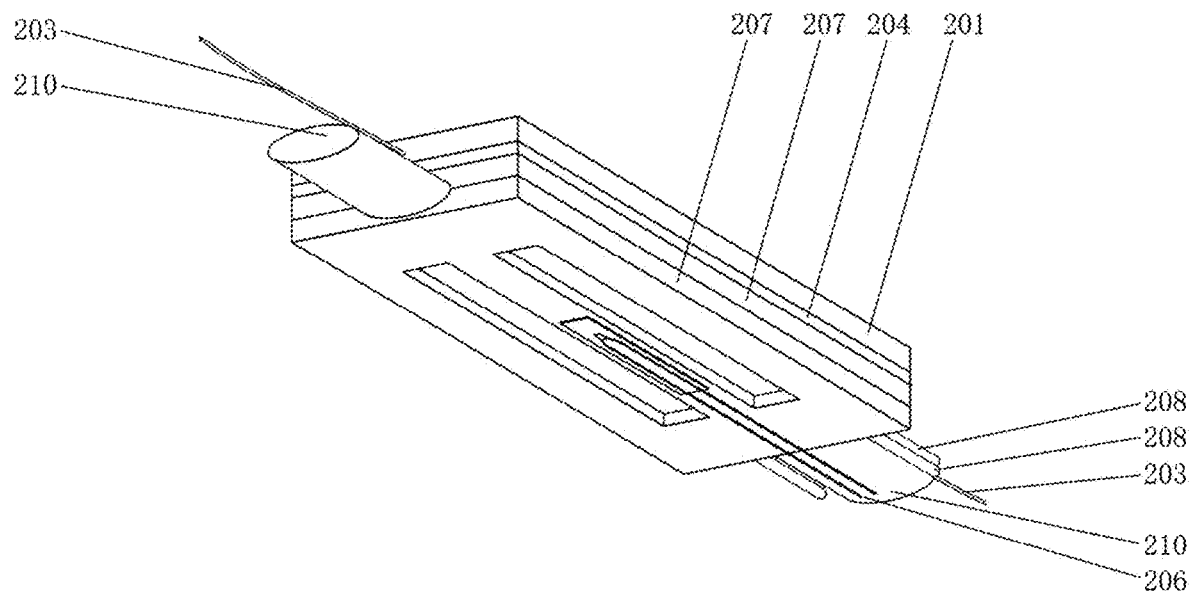
FIG. 20 is a schematic diagram of a partial structure of FIG. 19.
Figure 21:
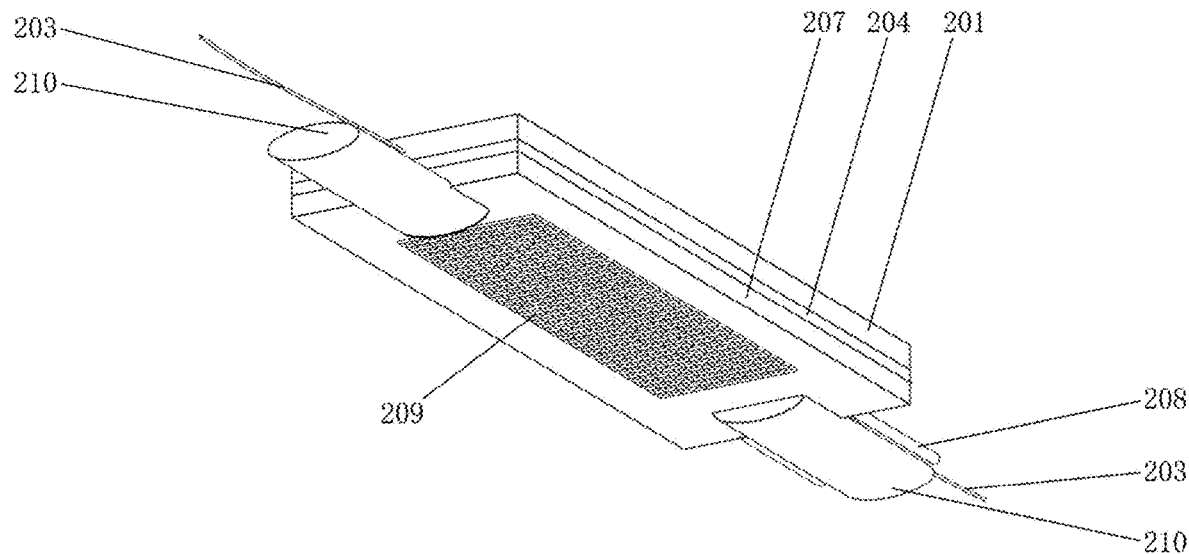
FIG. 21 is a schematic diagram of a partial structure of FIG. 20.
Figure 22:
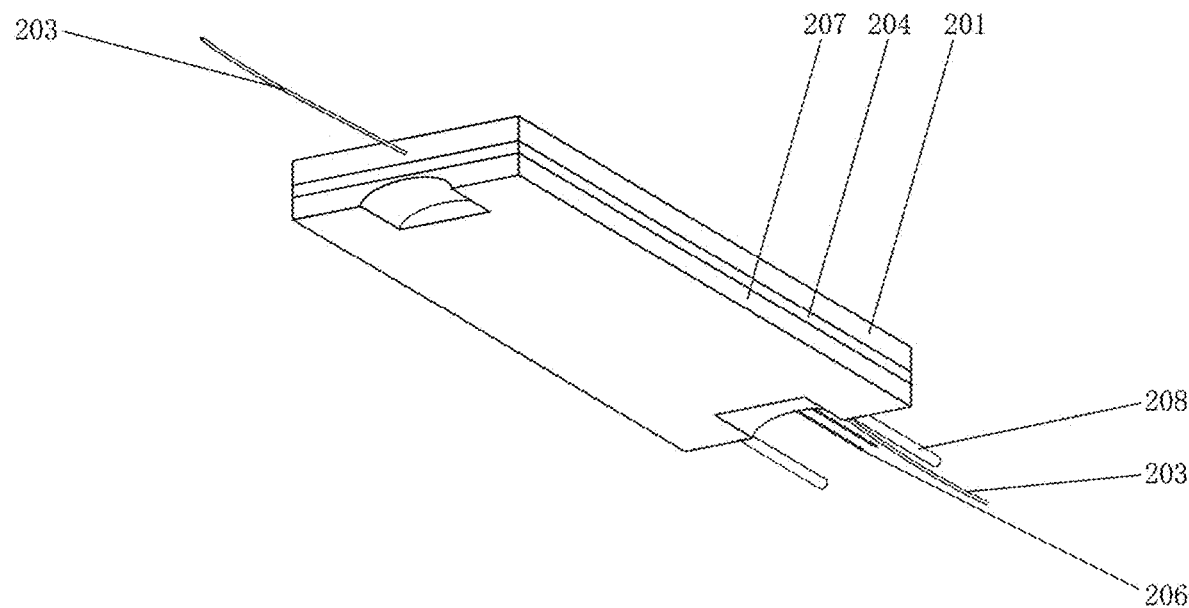
FIG. 22 is a schematic diagram of a partial structure of FIG. 21.
Figure 23:
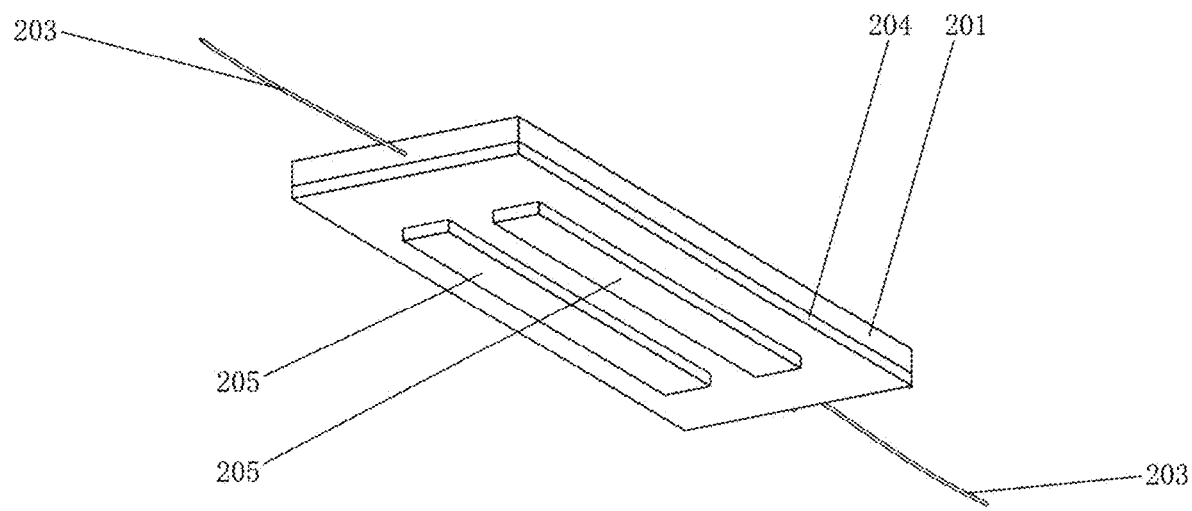
FIG. 23 is a schematic diagram of a partial structure of FIG. 22.
Figure 24:
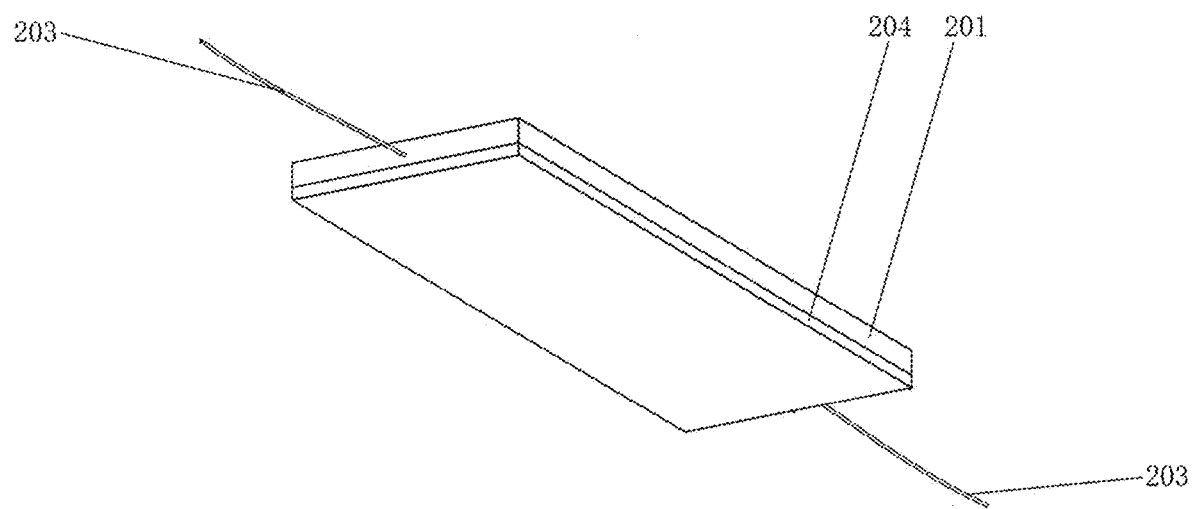
FIG. 24 is a schematic diagram of a partial structure of FIG. 23.
Figure 25:
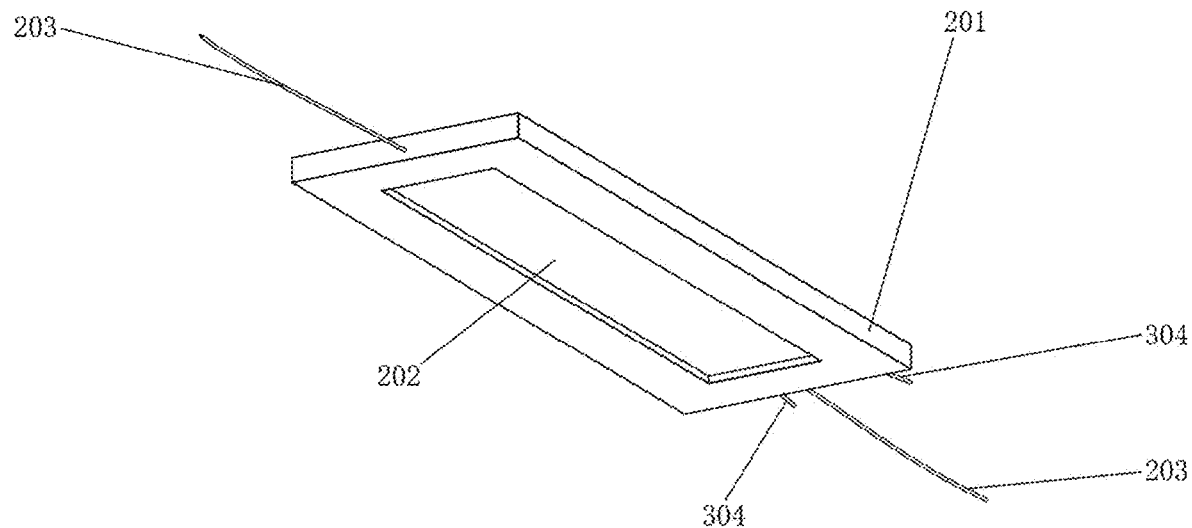
FIG. 25 is a schematic diagram of a partial structure of FIG. 24.
Figure 26:
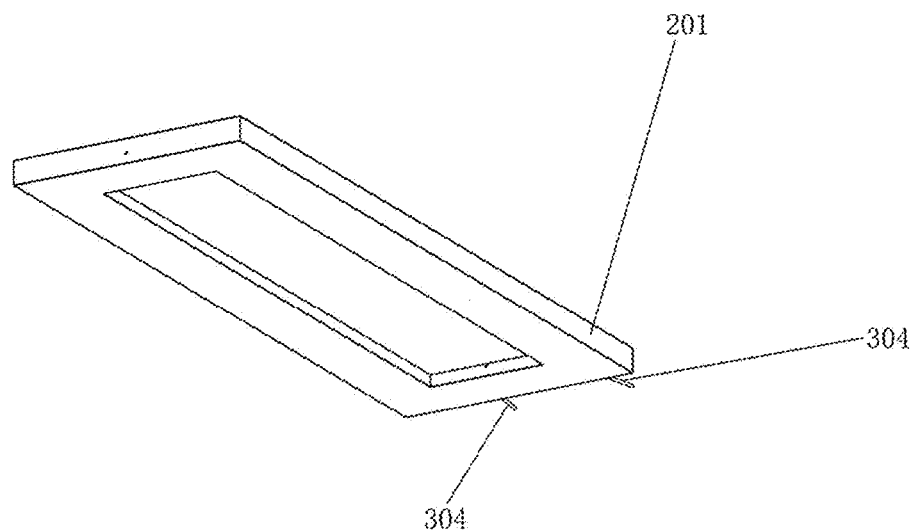
FIG. 26 is a schematic diagram of a partial structure of FIG. 25.
Figure 27:
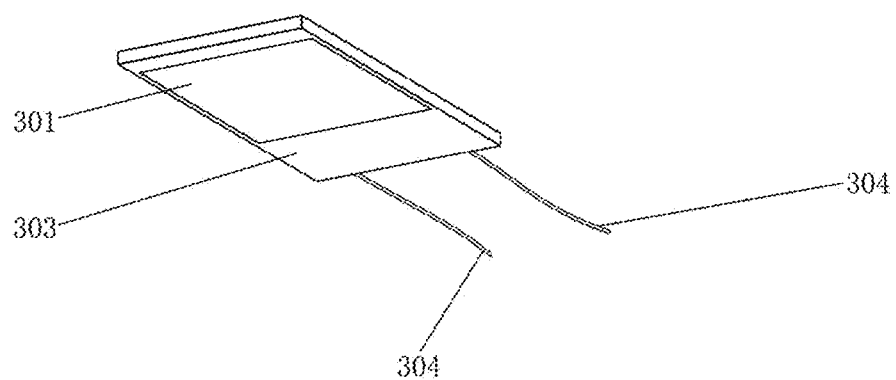
FIG. 27 is a schematic diagram of a partial structure of FIG. 26.
Figure 28:
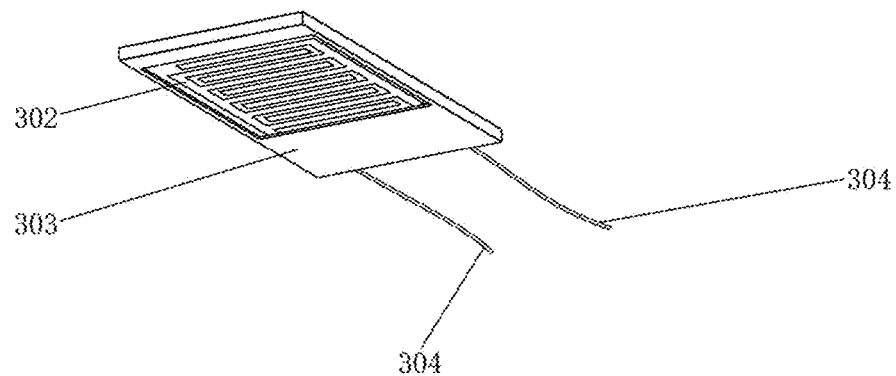
FIG. 28 is a schematic diagram of a partial structure of FIG. 27.
Figure 29:
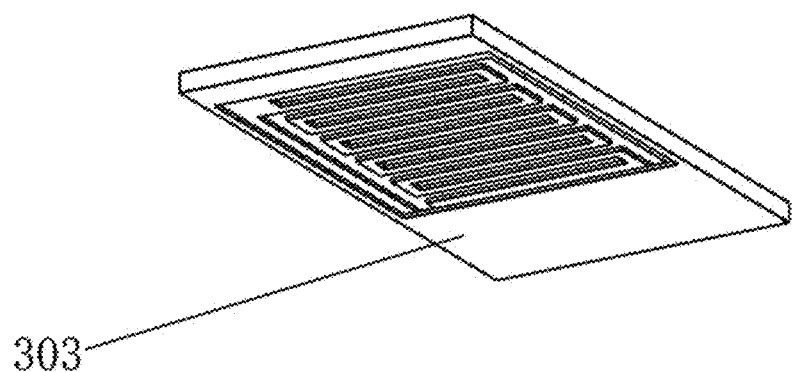
FIG. 29 is a schematic diagram of a partial structure of FIG. 28.
Figure 30:
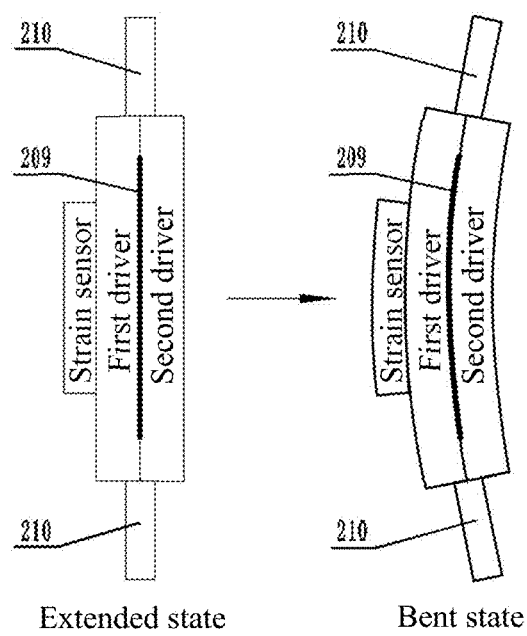
FIG. 30 is a schematic diagram showing deformation of a single power structure from an extended state to a bent state in the present disclosure.
Figure 31:
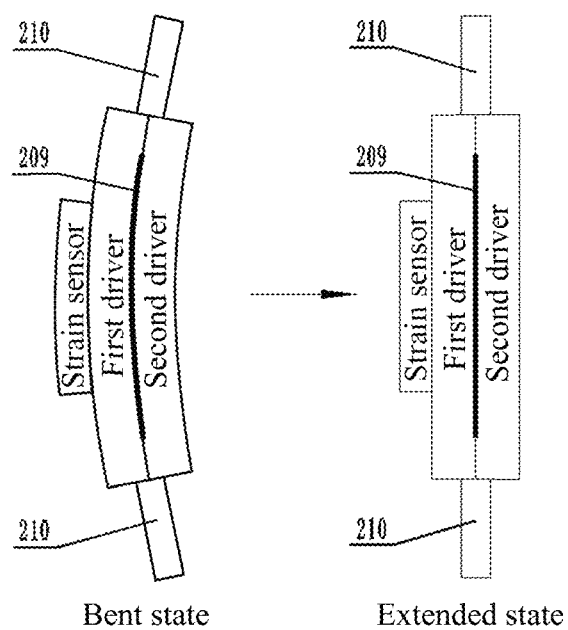
FIG. 31 is a schematic diagram showing deformation of a single power structure from a bent state to an extended state in the present disclosure.

In the figures: 1-glove, 201-flexible heat insulation layer, 202-flexible electric heating layer, 203-flexible wire A, 204-flexible packaging layer A, 205-liquid crystal elastomer driving layer, 206-thin film temperature sensor, 207-flexible water cooling layer, 208-flexible water pipe, 209-variable-stiffness grid layer, 210-transmission skeleton, 301-flexible sensitive layer, 302-flexible interdigital electrode, 303-flexible packaging layer B, 304-flexible wire B.

DETAILED DESCRIPTION OF THE EMBODIMENTS

A sandwich bionic soft gripper capable of automatically assisting in grasping includes a glove 1 and fourteen power structures.

Each power structure includes two drivers, a variable-stiffness grid layer 209, a pair of transmission skeletons 210, and a strain sensor.

Each driver includes a flexible heat insulation layer 201, a flexible electric heating layer 202, a pair of flexible wires A 203, a flexible packaging layer A 204, a pair of liquid crystal elastomer driving layers 205, a thin film temperature sensor 206, a flexible water cooling layer 207, and a flexible water pipe 208. A front surface of the flexible heat insulation layer 201 is provided with a cavity. The flexible electric heating layer 202 is stacked on a bottom surface of the cavity. The pair of flexible wires A 203 is embedded inside the flexible heat insulation layer 201. Each head end of the pair of flexible wires A 203 is connected to the flexible electric heating layer 202. Each tail end of the pair of flexible wires A 203 is led out. The flexible packaging layer A 204 is stacked on both the front surface of the flexible heat insulation layer 201 and a front surface of the flexible electric heating layer 202. The pair of liquid crystal elastomer driving layers 205 is stacked side by side on a front surface of the flexible packaging layer A 204. The thin film temperature sensor 206 is stacked on the front surface of the flexible packaging layer A 204, and the thin film temperature sensor 206 is located between the pair of liquid crystal elastomer driving layers 205. Two ends of the thin film temperature sensor 206 are led out. The flexible water cooling layer 207 is stacked on the front surface of the flexible packaging layer A 204, a front surface of the pair of liquid crystal elastomer driving layers 205, and a front surface of the thin film temperature sensor 206. A front surface edge of the flexible water cooling layer 207 is provided with a pair of mutually symmetrical notches. The flexible water pipe 208 is embedded inside the flexible water cooling layer 207. Two ends of the flexible water pipe 208 are led out.

Front surfaces of two flexible water cooling layers 207 in each power structure are in butt joint with each other, and the variable-stiffness grid layer 209 in each power structure is sandwiched between the front surfaces of the two flexible water cooling layers 207. Two pairs of notches in each power structure are in butt joint to form a pair of concave holes, and the pair of transmission skeletons 210 in each power structure is inserted into one pair of concave holes, respectively.

Each strain sensor includes a flexible sensitive layer 301, a flexible interdigital electrode 302, a flexible packaging layer B 303, and a pair of flexible wires B 304. The flexible sensitive layer 301 is stacked on a back surface of a first flexible heat insulation layer 201 of a corresponding power structure. The flexible interdigital electrode 302 is stacked on a front surface of the flexible sensitive layer 301. The flexible packaging layer B 303 is stacked on the back surface of the first flexible heat insulation layer 201 of the corresponding power structure, the front surface of the flexible sensitive layer 301 and a front surface of the flexible interdigital electrode 302. The pair of flexible wires B 304 is embedded inside the flexible packaging layer B 303. Head ends of the pair of flexible wires B 304 are respectively connected to the two poles of the flexible interdigital electrode 302. Each tail end of the pair of flexible wires B 304 is led out.

The glove 1 is of a double-layer structure. The fourteen power structures are all sandwiched between a finger dorsum inner layer and a finger dorsum outer layer of the glove 1, and the fourteen power structures are located in a one-to-one correspondence at nine interphalangeal joints and five metacarpophalangeal joints of the glove 1. Tail ends of each pair of flexible wires A 203, two ends of each thin film temperature sensor 206, two ends of each flexible water pipe 208, and tail ends of each pair of flexible wires B 304 penetrate the finger dorsum outer layer of the glove 1 to be led out. Each transmission skeleton 210 is arranged along a direction of a corresponding finger. Each flexible packaging layer B303 is in contact with the finger dorsum outer layer of the glove 1.

An inner layer of the glove 1 is made of polyester fiber; and an outer layer of the glove 1 is made of polyester.

The flexible heat insulation layer 201 has a thickness of 2 mm; the cavity has a depth of 1 mm; the liquid crystal elastomer driving layer 205 has a thickness of 0.5 mm; and the flexible water cooling layer 207 has a thickness of 1.5 mm.

A preparation method for a sandwich bionic soft gripper capable of automatically assisting in grasping (the method is used to prepare the sandwich bionic soft gripper capable of automatically assisting in grasping according to the present disclosure) is provided. The method is implemented by following steps 1-8.

Step 1: A first driver is prepared, with specific steps 1.1-1.8.

Step 1.1: ESSIL296 silicone rubber is injected into a mold, and a first pair of flexible wires A 203 is immersed in the ESSIL296 silicone rubber, and then the ESSIL296 silicone rubber is cured and molded to obtain a first flexible heat insulation layer 201 with a front surface provided with a first cavity.

Step 1.2: A carbon nanotube suspension is evenly sprayed on a bottom surface of the first cavity, and then is heated to volatilize a solvent thereof to obtain a first flexible electric heating layer 202.

Step 1.3: Low surface energy treatment is performed on the first flexible heat insulation layer 201 and the first flexible electric heating layer 202 by using a KH550 hydrolyzed silane coupling agent solution.

Step 1.4: A pre-prepared Ecoflex00-50 prepolymer mixture is poured on a front surface of the first flexible heat insulation layer 201 and a front surface of the first flexible electric heating layer 202, and then is cured and molded to obtain a first flexible packaging layer A 204.

Step 1.5: A pre-prepared liquid crystal elastomer mixture is injected into the mold, and then is cured and molded to obtain a first pair of liquid crystal elastomer driving layers 205.

Step 1.6: The low surface energy treatment is performed on the first flexible packaging layer A 204 and the first pair of liquid crystal elastomer driving layers 205 by using the KH550 hydrolyzed silane coupling agent solution, and then the first pair of liquid crystal elastomer driving layers 205 is bonded to a front surface of the first flexible packaging layer A 204 side by side.

Step 1.7: A pre-selected first thin film temperature sensor 206 is bonded to the front surface of the first flexible packaging layer A 204, and it is ensured that the first thin film temperature sensor 206 is located between the first pair of liquid crystal elastomer driving layers 205.

Step 1.8: The pre-prepared Ecoflex00-50 prepolymer mixture is poured on the front surface of the first flexible packaging layer A 204, each front surface of the first pair of liquid crystal elastomer driving layers 205 and a front surface of the first thin film temperature sensor 206, and a first flexible water pipe 208 is immersed in the Ecoflex00-50 prepolymer mixture, and then the Ecoflex00-50 prepolymer mixture is cured and molded at 85° C. to obtain a first flexible water cooling layer 207. Then, a first pair of notches is provided in a front surface edge of the first flexible water cooling layer 207 to obtain the first driver.

Step 2: A second driver is prepared, with specific steps 2.1-2.8.

Step 2.1: The ESSIL296 silicone rubber is injected into the mold, and a second pair of flexible wires A 203 is immersed in the ESSIL296 silicone rubber, and then the ESSIL296 silicone rubber is cured and molded to obtain a second flexible heat insulation layer 201 with a front surface provided with a second cavity.

Step 2.2: The carbon nanotube suspension is evenly sprayed on a bottom surface of the second cavity, and then is heated to volatilize the solvent thereof to obtain a second flexible electric heating layer 202.

Step 2.3: The low surface energy treatment is performed on the second flexible heat insulation layer 201 and the second flexible electric heating layer 202 by using the KH550 hydrolyzed silane coupling agent solution.

Step 2.4: The pre-prepared Ecoflex00-50 prepolymer mixture is poured on a front surface of the second flexible heat insulation layer 201 and a front surface of the second flexible electric heating layer 202, and then is cured and molded to obtain a second flexible packaging layer A 204.

Step 2.5: The pre-prepared liquid crystal elastomer mixture is injected into the mold, and then is cured and molded to obtain a second pair of liquid crystal elastomer driving layers 205.

Step 2.6: The low surface energy treatment is performed on the second flexible packaging layer A 204 and the second pair of liquid crystal elastomer driving layers 205 by using the KH550 hydrolyzed silane coupling agent solution, and then the second pair of liquid crystal elastomer driving layers 205 is bonded to a front surface of the second flexible packaging layer A 204 side by side.

Step 2.7: A pre-selected second thin film temperature sensor 206 is bonded to the front surface of the second flexible packaging layer A 204, and it is ensured that the second thin film temperature sensor 206 is located between the second pair of liquid crystal elastomer driving layers 205.

Step 2.8: The pre-prepared Ecoflex00-50 prepolymer mixture is poured on the front surface of the second flexible packaging layer A 204, each front surface of the second pair of liquid crystal elastomer driving layers 205 and a front surface of the second thin film temperature sensor 206, and a second flexible water pipe 208 is immersed in the Ecoflex00-50 prepolymer mixture, and then the Ecoflex00-50 prepolymer mixture is cured and molded at 24° C. to obtain a second flexible water cooling layer 207. Then, a second pair of notches is provided in a front surface edge of the second flexible water cooling layer 207 to obtain the second driver.

Step 3: A variable-stiffness grid layer 209 is prepared, with specific steps as follows:
 a low melting alloy (metals and their alloys with melting points below 300° C., e.g., tin bismuth alloy with melting point below 60° C.) is heated and melted and then is injected into a mold, and then is subjected to hot pressing molding to obtain the variable-stiffness grid layer 209.

Step 4: A pair of transmission skeletons 210 is prepared, with specific steps as follows:
 a thermoplastic polyurethane elastomer is heated and melted and then is injected into the mold, and then is subjected to hot pressing molding to obtain the pair of transmission skeletons 210.

Step 5: The variable-stiffness grid layer 209 is placed between the front surfaces of the two flexible water cooling layers 207, the front surfaces of the two flexible water cooling layers 207 are bonded to each other to cause the two pairs of notches to be in butt joint to form a pair of concave holes, and then the pair of transmission skeletons 210 is inserted into the pair of concave holes, respectively.

Step 6: A strain sensor is prepared, with specific steps 6.1-6.3.

Step 6.1: A flexible sensitive layer 301 is prepared, with specific steps as follows:
 polydimethylsiloxane, silver nanosheets, and reduced graphene oxide are mixed at a mass ratio of 10:10:1 and then are evenly stirred to obtain a mixed slurry, and then the flexible sensitive layer 301 made of the mixed slurry is prepared on a back surface of the first flexible heat insulation layer 201 by a blade coating method.

Step 6.2: A flexible interdigital electrode 302 is prepared, with specific steps as follows:
 a substrate made of the ESSIL296 silicone rubber is prepared by the blade coating method, and the flexible interdigital electrode 302 is printed on the substrate by a piezoelectric inkjet printer, and then is transferred to a front surface of the flexible sensitive layer 301.

Step 6.3: A flexible packaging layer B 303 is prepared, with specific steps as follows:
 A pre-prepared Ecoflex00-50 prepolymer mixture is poured on the back surface of the first flexible heat insulation layer 201, the front surface of the flexible sensitive layer 301, and a front surface of the flexible interdigital electrode 302, and a pair of flexible wires B 304 is immersed in the Ecoflex00-50 prepolymer mixture, and then the Ecoflex00-50 prepolymer mixture is cured and molded to obtain the flexible packaging layer B 303, to prepare the strain sensor and thus prepare a power structure.

Step 7: Steps 1 to 6 are repeated to prepare fourteen power structures.

Step 8: The fourteen power structures are sewn between a finger dorsum inner layer and a finger dorsum outer layer of the glove 1, which, in an aspect, ensures that the fourteen power structures are located in a one-to-one correspondence at nine interphalangeal joints and five metacarpophalangeal joints of the glove 1, in another aspect, ensures that tail ends of each pair of flexible wires A 203, two ends of each thin film temperature sensor 206, two ends of each flexible water pipe 208, and tail ends of each pair of flexible wires B 304 penetrate the finger dorsum outer layer of the glove 1 to be led out, in a third aspect, ensures that each transmission skeleton 210 is arranged along a direction of a corresponding finger, and in a fourth aspect, ensures that each flexible packaging layer B 303 is in contact with the finger dorsum outer layer of the glove 1.

The preparation of the Ecoflex00-50 prepolymer mixture includes the following steps: an Ecoflex00-50 component A and an Ecoflex00-50 component B are mixed at a mass ratio of 1:1 and are evenly stirred to obtain the Ecoflex00-50 prepolymer mixture. The Ecoflex00-50 component A is a platinum catalyzed silicone rubber matrix; and the Ecoflex00-50 component B is a curing agent of platinum catalyzed silicone rubber matrix.

The preparation of the liquid crystal elastomer mixture includes the following steps: liquid crystal monomers and toluene are first mixed in a beaker at a mass ratio of 115:36 to obtain a liquid crystal monomer mixed liquor; then the liquid crystal monomer mixed liquor is placed on a drying table at 100° C. for heating for 20 min, and pentaerythritol tetra(3-mercaptopropionate), 2-hydroxy-2-methylpropiophenone and dopamine are sequentially added into the liquid crystal monomer mixed liquor, and then the liquid crystal monomer mixed liquor is magnetically stirred for 3 min, and is subjected to vacuum degassing for 2 min to obtain the liquid crystal elastomer mixture. The pentaerythritol tetra (3-mercaptopropionate) is used as a crosslinking agent, and the pentaerythritol tetra(3-mercaptopropionate) and the liquid crystal monomer mixed liquor are at a mass ratio of 1:151. The 2-hydroxy-2-methylpropiophenone is used as a photoinitiator, and the 2-hydroxy-2-methylpropiophenone and the liquid crystal monomer mixed liquor are at a mass ratio of 25:151. The dopamine is used as a catalyst.

During operation, two external power sources, two external circulating water sources, and an external controller are provided. Each tail end of the first pair of flexible wires A 203 of each power structure is connected to a first external power source. Each tail end of the second pair of flexible wires A 203 of each power structure is connected to a second external power source. Two ends of the first flexible water pipe 208 of each power structure are connected with a first external circulating water source. Two ends of the second flexible water pipe 208 of each power structure are connected with a second external circulating water source. Two ends of each thin film temperature sensor 206, tail ends of each pair of flexible wires B 304, the two external power sources and the two external circulating water sources are all connected to the external controller.

It should be noted that in each power structure, since the two flexible water cooling layers 207 are subjected to curing and molding at completely different temperatures, the two pairs of liquid crystal elastomer driving layers 205 are deformed in completely different manners. The specific explanation is as follows.

I. Since the first flexible water cooling layer 207 is cured and molded at high temperature (a curing and molding temperature of 85° C.), the first pair of liquid crystal elastomer driving layers 205 is deformed in the following manner: extending along an orientation direction at high temperature and bending along the orientation direction at room temperature.

II. Since the second flexible water cooling layer 207 is cured and molded at room temperature (a curing and molding temperature of 24° C.), the second pair of liquid crystal elastomer driving layers 205 is deformed in the following manner: extending along the orientation direction at room temperature and bending along the orientation direction at high temperature.

An operating state of each power structure includes an extended state and a bent state.

A specific operating process is as follows.

The glove is first worn on a hand of a patient.

If the patient wants to grasp an object, the fourteen power structures are controlled to deform from the extended state to the bent state. Driven by the fourteen power structures, the glove and five fingers of the patient are deformed from the extended state to the bent state, thereby grasping the object.

If the patient wants to release an object being grasped, the fourteen power structures are controlled to deform from the bent state to the extended state. Driven by the fourteen power structures, the glove and the five fingers of the patient are deformed from the bent state to the extended state, thereby releasing the object being grasped.

A process of controlling the deformation of a single power structure from the extended state to the bent state is as follows.

The external controller first controls the second external power source to be turned on (the first external power source remains off), so that the second flexible electric heating layer 202 is electrified and emits heat, and thus the variable-stiffness grid layer 209 is heated to be in a molten state.

In this case, the second pair of liquid crystal elastomer driving layers 205 is heated to be bent in the orientation direction, while the first pair of liquid crystal elastomer driving layers 205 is bent in the orientation direction without being heated. Since the two pairs of liquid crystal elastomer driving layers 205 are both bent in the orientation direction, the two drivers are bent in the orientation direction, so that the power structure is bent in the orientation direction, and thus the power structure is deformed into the bent state.

Then, the external controller controls the first external circulating water source to be turned on (the second external circulating water source remains off), so that cooling water in the first flexible water pipe 208 circulates, and thus the variable-stiffness grid layer 209 is cooled to be in a solidified state, thereby preventing the power structure from returning to an extended state.

Then, the external controller controls the second external power source to be turned off while controlling the first external circulating water source to be turned off.

In the above process, the two thin film temperature sensors 206 measure the temperature of the power structure in real time and send measurement results to the external controller in real time. The strain sensor measures the deformation of the power structure in real time and sends a measurement result to the external controller in real time. The external controller controls switching times of the second external power source and the first external circulating water source in real time based on the measurement results, thereby controlling the temperature and deformation of the power structure in real time.

A process of controlling the deformation of a single power structure from the bent state to the extended state is as follows.

The external controller first controls the first external power source to be turned on (the second external power source remains off), so that the first flexible electric heating layer 202 is electrified and emits heat, and thus the variable-stiffness grid layer 209 is heated to be in a molten state.

In this case, the first pair of liquid crystal elastomer driving layers 205 is heated to be extended in the orientation direction, while the second pair of liquid crystal elastomer driving layers 205 is extended in the orientation direction without being heated. Since the two pairs of liquid crystal elastomer driving layers 205 are both extended in the orientation direction, the two drivers are extended in the orientation direction, so that the power structure is extended in the orientation direction, and thus the power structure is deformed into the extended state.

Then, the external controller controls the second external circulating water source to be turned on (the first external circulating water source remains off), so that cooling water in the second flexible water pipe 208 circulates, and thus the variable-stiffness grid layer 209 is cooled to be in a solidified state, thereby preventing the power structure from returning to the bent state.

Then, the external controller controls the first external power source to be turned off while controlling the second external circulating water source to be turned off.

In the above process, the two thin film temperature sensors 206 measure the temperature of the power structure in real time and send measurement results to the external controller in real time. The strain sensor measures the deformation of the power structure in real time and sends a measurement result to the external controller in real time. The external controller controls switching times of the first external power source and the second external circulating water source in real time based on the measurement results, thereby controlling the temperature and deformation of the power structure in real time.

Although specific implementations of the present disclosure have been described above, those skilled in the art should understand that these are only illustrative, and the scope of protection of the present disclosure is defined by the appended claims. Various alterations or modifications to these implementations can be made by those skilled in the art without departing from the principle and essence of the present disclosure. However, these alterations and modifications all fall within the scope of protection of the present disclosure.

What is claimed is:

1. A sandwich bionic soft gripper capable of automatically assisting in grasping, comprising a glove (1) and fourteen power structures, wherein each power structure comprises two drivers, a variable-stiffness grid layer (209), a pair of transmission skeletons (210), and a strain sensor;

each driver comprises a flexible heat insulation layer (201), a flexible electric heating layer (202), a pair of flexible wires A (203), a flexible packaging layer A (204), a pair of liquid crystal elastomer driving layers (205), a thin film temperature sensor (206), a flexible water cooling layer (207), and a flexible water pipe (208); a front surface of the flexible heat insulation layer (201) is provided with a cavity; the flexible electric heating layer (202) is stacked on a bottom surface of the cavity; the pair of flexible wires A (203) is embedded inside the flexible heat insulation layer (201); each head end of the pair of flexible wires A (203) is connected to the flexible electric heating layer (202); each tail end of the pair of flexible wires A (203) is led out; the flexible packaging layer A (204) is stacked on both the front surface of the flexible heat insulation layer (201) and a front surface of the flexible electric heating layer (202); the pair of liquid crystal elastomer driving layers (205) is stacked side by side on a front surface of the flexible packaging layer A (204); the thin film temperature sensor (206) is stacked on the front surface of the flexible packaging layer A (204), and the thin film temperature sensor (206) is located between the pair of liquid crystal elastomer driving layers (205); two ends of the thin film temperature sensor (206) are led out; the flexible water cooling layer (207) is stacked on the front surface of the flexible packaging layer A (204), a front surface of the pair of liquid crystal elastomer driving layers (205), and a front surface of the thin film temperature sensor (206); a front surface edge of the flexible water cooling layer (207) is provided with a pair of mutually symmetrical notches; the flexible water pipe (208) is embedded inside the flexible water cooling layer (207); two ends of the flexible water pipe (208) are led out;

front surfaces of two flexible water cooling layers (207) in each power structure are in butt joint with each other, and the variable-stiffness grid layer (209) in each power structure is sandwiched between the front surfaces of the two flexible water cooling layers (207); two pairs of notches in each power structure are in butt joint to form a pair of concave holes, and one pair of transmission skeletons (210) in the power structure is inserted into one pair of concave holes, respectively;

each strain sensor comprises a flexible sensitive layer (301), a flexible interdigital electrode (302), a flexible packaging layer B (303), and a pair of flexible wires B (304); the flexible sensitive layer (301) is stacked on a back surface of a first flexible heat insulation layer (201) of a corresponding power structure; the flexible interdigital electrode (302) is stacked on a front surface of the flexible sensitive layer (301); the flexible packaging layer B (303) is stacked on the back surface of the first flexible heat insulation layer (201) of the corresponding power structure, the front surface of the flexible sensitive layer (301) and a front surface of the flexible interdigital electrode (302); the pair of flexible wires B (304) is embedded inside the flexible packaging layer B (303); head ends of the pair of flexible wires B (304) are respectively connected to two poles of the flexible interdigital electrode (302); each tail end of the pair of flexible wires B (304) is led out;

the glove (1) is of a double-layer structure; the fourteen power structures are all sandwiched between a finger dorsum inner layer and a finger dorsum outer layer of the glove (1), and the fourteen power structures are located in a one-to-one correspondence at nine interphalangeal joints and five metacarpophalangeal joints of the glove (1); tail ends of each pair of flexible wires A (203), two ends of each thin film temperature sensor (206), two ends of each flexible water pipe (208), and tail ends of each pair of flexible wires B (304) penetrate the finger dorsum outer layer of the glove (1) to be led out; each transmission skeleton (210) is arranged along a direction of a corresponding finger; and each flexible packaging layer B (303) is in contact with the finger dorsum outer layer of the glove (1).

2. The sandwich bionic soft gripper capable of automatically assisting in grasping according to claim 1, wherein an inner layer of the glove (1) is made of polyester fiber; and an outer layer of the glove (1) is made of polyester.

3. The sandwich bionic soft gripper capable of automatically assisting in grasping according to claim 1, wherein the flexible heat insulation layer (201) has a thickness of 2 mm;

the cavity has a depth of 1 mm; the liquid crystal elastomer driving layer (205) has a thickness of 0.5 mm; and the flexible water cooling layer (207) has a thickness of 1.5 mm.

4. A preparation method for a sandwich bionic soft gripper capable of automatically assisting in grasping, wherein the method is used to prepare the sandwich bionic soft gripper capable of automatically assisting in grasping according to claim 1, and the method is implemented by following steps:

step 1: preparing a first driver, with steps as follows:
- step 1.1: injecting ESSIL296 silicone rubber into a mold, immersing a first pair of flexible wires A (203) in the ESSIL296 silicone rubber, and then curing and molding to obtain the first flexible heat insulation layer (201) with a front surface provided with a first cavity;
- step 1.2: evenly spraying a carbon nanotube suspension on a bottom surface of the first cavity, and then heating the carbon nanotube suspension to volatilize a solvent thereof to obtain a first flexible electric heating layer (202);
- step 1.3: performing low surface energy treatment on the first flexible heat insulation layer (201) and the first flexible electric heating layer (202) by using a KH550 hydrolyzed silane coupling agent solution;
- step 1.4: pouring a pre-prepared Ecoflex00-50 prepolymer mixture on a front surface of the first flexible heat insulation layer (201) and a front surface of the first flexible electric heating layer (202), and then curing and molding to obtain a first flexible packaging layer A (204);
- step 1.5: injecting a pre-prepared liquid crystal elastomer mixture into the mold, and then curing and molding to obtain a first pair of liquid crystal elastomer driving layers (205);
- step 1.6: performing the low surface energy treatment on the first flexible packaging layer A (204) and the first pair of liquid crystal elastomer driving layers (205) by using the KH550 hydrolyzed silane coupling agent solution, and then bonding the first pair of liquid crystal elastomer driving layers (205) to a front surface of the first flexible packaging layer A (204) side by side;
- step 1.7: bonding a pre-selected first thin film temperature sensor (206) to the front surface of the first flexible packaging layer A (204), and ensuring that the first thin film temperature sensor (206) is located between the first pair of liquid crystal elastomer driving layers (205); and
- step 1.8: pouring the pre-prepared Ecoflex00-50 prepolymer mixture on the front surface of the first flexible packaging layer A (204), each front surface of the first pair of liquid crystal elastomer driving layers (205) and a front surface of the first thin film temperature sensor (206), immersing a first flexible water pipe (208) in the Ecoflex00-50 prepolymer mixture, and then curing and molding at 85° C. to obtain a first flexible water cooling layer (207); and then, providing a first pair of notches in a front surface edge of the first flexible water cooling layer (207) to obtain the first driver;

step 2: preparing a second driver, with steps as follows:
- step 2.1: injecting the ESSIL296 silicone rubber into the mold, immersing a second pair of flexible wires A (203) in the ESSIL296 silicone rubber, and then curing and molding to obtain a second flexible heat insulation layer (201) with a front surface provided with a second cavity;
- step 2.2: evenly spraying the carbon nanotube suspension on a bottom surface of the second cavity, and then heating the carbon nanotube suspension to volatilize the solvent thereof to obtain a second flexible electric heating layer (202);
- step 2.3: performing the low surface energy treatment on the second flexible heat insulation layer (201) and the second flexible electric heating layer (202) by using the KH550 hydrolyzed silane coupling agent solution;
- step 2.4: pouring the pre-prepared Ecoflex00-50 prepolymer mixture on a front surface of the second flexible heat insulation layer (201) and a front surface of the second flexible electric heating layer (202), and then curing and molding to obtain a second flexible packaging layer A (204);
- step 2.5: injecting the pre-prepared liquid crystal elastomer mixture into the mold, and then curing and molding to obtain a second pair of liquid crystal elastomer driving layers (205);
- step 2.6: performing the low surface energy treatment on the second flexible packaging layer A (204) and the second pair of liquid crystal elastomer driving layers (205) by using the KH550 hydrolyzed silane coupling agent solution, and then bonding the second pair of liquid crystal elastomer driving layers (205) to a front surface of the second flexible packaging layer A (204) side by side;
- step 2.7: bonding a pre-selected second thin film temperature sensor (206) to the front surface of the second flexible packaging layer A (204), and ensuring that the second thin film temperature sensor (206) is located between the second pair of liquid crystal elastomer driving layers (205); and
- step 2.8: pouring the pre-prepared Ecoflex00-50 prepolymer mixture on the front surface of the second flexible packaging layer A (204), each front surface of the second pair of liquid crystal elastomer driving layers (205) and a front surface of the second thin film temperature sensor (206), immersing a second flexible water pipe (208) in the Ecoflex00-50 prepolymer mixture, and then curing and molding at 24° C. to obtain a second flexible water cooling layer (207); and then, providing a second pair of notches in a front surface edge of the second flexible water cooling layer (207) to obtain the second driver;

step 3: preparing the variable-stiffness grid layer (209), with steps as follows:
heating and melting a low melting alloy and then injecting the alloy into the mold, and then performing hot pressing molding to obtain the variable-stiffness grid layer (209);

step 4: preparing the pair of transmission skeletons (210), with steps as follows:
heating and melting a thermoplastic polyurethane elastomer and then injecting the thermoplastic polyurethane elastomer into the mold, and then performing hot pressing molding to obtain the pair of transmission skeletons (210);

step 5: placing the variable-stiffness grid layer (209) between the front surfaces of the two flexible water cooling layers (207), bonding the front surfaces of the two flexible water cooling layers (207) to each other to cause the two pairs of notches to be in butt joint to form the pair of concave holes, and then inserting the pair of transmission skeletons (210) into the pair of concave holes;

step 6: preparing the strain sensor, with steps as follows:
step 6.1: preparing the flexible sensitive layer (301), with steps as follows:

mixing polydimethylsiloxane, silver nanosheets, and reduced graphene oxide at a mass ratio of 10:10:1 and then evenly stirring to obtain a mixed slurry, and then preparing the flexible sensitive layer (301) made of the mixed slurry on the back surface of the first flexible heat insulation layer (201) by a blade coating method;

step 6.2: preparing the flexible interdigital electrode (302), with steps as follows:

preparing a substrate made of the ESSIL296 silicone rubber by the blade coating method, printing the flexible interdigital electrode (302) on the substrate by a piezoelectric inkjet printer, and then transferring the flexible interdigital electrode (302) to the front surface of the flexible sensitive layer (301);

step 6.3: preparing the flexible packaging layer B (303), with steps as follows:

pouring the pre-prepared Ecoflex00-50 prepolymer mixture on the back surface of the first flexible heat insulation layer (201), the front surface of the flexible sensitive layer (301), and the front surface of the flexible interdigital electrode (302), immersing the pair of flexible wires B (304) in the Ecoflex00-50 prepolymer mixture, and then curing and molding to obtain the flexible packaging layer B (303), to prepare the strain sensor and thus prepare the power structure;

step 7: repeating the steps 1 to 6 to prepare the fourteen power structures; and step 8: sewing the fourteen power structures between the finger dorsum inner layer and the finger dorsum outer layer of the glove (1), which, in an aspect, ensures that the fourteen power structures are located in a one-to-one correspondence at nine interphalangeal joints and five metacarpophalangeal joints of the glove (1), in another aspect, ensures that tail ends of each pair of flexible wires A (203), two ends of each thin film temperature sensor (206), two ends of each flexible water pipe (208), and tail ends of each pair of flexible wires B (304) penetrate the finger dorsum outer layer of the glove (1) to be led out, in a third aspect, ensures that each transmission skeleton (210) is arranged along a direction of a corresponding finger, and in a fourth aspect, ensures that each flexible packaging layer B (303) is in contact with the finger dorsum outer layer of the glove (1).

5. The preparation method according to claim 4, wherein the preparation of the Ecoflex00-50 prepolymer mixture comprises following steps: mixing an Ecoflex00-50 component A and an Ecoflex00-50 component B at a mass ratio of 1:1 and evenly stirring to obtain the Ecoflex00-50 prepolymer mixture, wherein the Ecoflex00-50 component A is a platinum catalyzed silicone rubber matrix; and the Ecoflex00-50 component B is a curing agent of platinum catalyzed silicone rubber matrix.

6. The preparation method according to claim 4, wherein the preparation of the liquid crystal elastomer mixture comprises following steps: first mixing liquid crystal monomers and toluene in a beaker at a mass ratio of 115:36 to obtain a liquid crystal monomer mixed liquor; and then placing the liquid crystal monomer mixed liquor on a drying table at 100° C. for heating for 20 min, sequentially adding pentaerythritol tetra(3-mercaptopropionate), 2-hydroxy-2-methylpropiophenone and dopamine into the liquid crystal monomer mixed liquor, magnetically stirring for 3 min, and performing vacuum degassing for 2 min to obtain the liquid crystal elastomer mixture, wherein the pentaerythritol tetra (3-mercaptopropionate) is used as a crosslinking agent, and the pentaerythritol tetra(3-mercaptopropionate) and the liquid crystal monomer mixed liquor are at a mass ratio of 1:151; the 2-hydroxy-2-methylpropiophenone is used as a photoinitiator, and the 2-hydroxy-2-methylpropiophenone and the liquid crystal monomer mixed liquor are at a mass ratio of 25:151; and the dopamine is used as a catalyst.

\* \* \* \* \*